(12) United States Patent
Morita et al.

(10) Patent No.: US 6,745,967 B2
(45) Date of Patent: Jun. 8, 2004

(54) MAGNETIC TAPE CARTRIDGE

(75) Inventors: Kiyoo Morita, Kanagawa-ken (JP); Hideaki Shiga, Kanagawa-ken (JP); Daisuke Takahashi, Kanagawa-ken (JP); Yusuke Ishihara, Kanagawa (JP); Seiji Tsuyuki, Kanagawa (JP); Jeffrey S. McAllister, Boise, ID (US); Thomas Albrecht, San Jose, CA (US); Robert Ralph Heinze, San Clemente, CA (US)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/406,211

(22) Filed: Apr. 4, 2003

(65) Prior Publication Data

US 2003/0189119 A1 Oct. 9, 2003

Related U.S. Application Data

(62) Division of application No. 10/103,857, filed on Mar. 25, 2002, now Pat. No. 6,629,656, which is a division of application No. 09/852,635, filed on May 11, 2001, now Pat. No. 6,462,906, which is a division of application No. 09/216,856, filed on Dec. 21, 1998, now Pat. No. 6,349,016.

(30) Foreign Application Priority Data

Dec. 22, 1997 (JP) .............................. 9-352993

(51) Int. Cl.[7] .............................. G11B 23/107
(52) U.S. Cl. .................. 242/332.4; 360/132
(58) Field of Search ............... 242/332, 332.2, 242/332.4, 899, 348.2, 580, 532, 532.5; 360/131, 132, 134

(56) References Cited

U.S. PATENT DOCUMENTS 3,169,721 A     2/1965  Laa et al.
3,195,825 A  *  7/1965  Louzil ................ 242/332.4
3,761,906 A     9/1973  Finster et al.
3,934,840 A     1/1976  Inaga
4,027,832 A     6/1977  Lopata
4,131,305 A    12/1978  Lopata
4,364,529 A    12/1982  Barto, Jr. et al.
4,544,976 A    10/1985  Oishi et al.
4,608,614 A     8/1986  Rinkleib et al.
5,034,839 A     7/1991  Okamura et al.
5,257,747 A    11/1993  Mann
5,303,875 A  *  4/1994  Hoge et al. ............ 242/332.4
5,418,672 A     5/1995  Tischler
5,883,771 A     3/1999  Hoerger
5,927,633 A     7/1999  McAllister
5,979,813 A    11/1999  Mansbridge et al.
6,003,802 A    12/1999  Eaton et al.
6,034,839 A     3/2000  Hamming
6,057,992 A     5/2000  Kikuchi
6,079,651 A     6/2000  Hamming
6,079,654 A     6/2000  Sasou
6,082,652 A     7/2000  Theobald
6,092,762 A     7/2000  Aaron (List continued on next page.)

FOREIGN PATENT DOCUMENTS

EP    0 409 534 A2    1/1991
JP    5303801 A      11/1993
NL    280 760 A      12/1964
NL    281 598 A      12/1964
WO    WO 83/04453   12/1983

Primary Examiner—William A. Rivera
(74) Attorney, Agent, or Firm—Sughrue Mion, PLLC

(57) ABSTRACT

A magnetic tape cartridge has a cartridge casing, a single reel around which a magnetic tape is wound and which is contained in the cartridge casing for rotation and a leader pin fixed to the leading end portion of the magnetic tape. The leader pin is provided at its opposite ends with engagement portions which are brought into engagement with a tape drawing mechanism of a recording and reproducing system when the magnetic tape cartridge is loaded in the recording and reproducing system. The end face of each engagement portion is provided with a recess at which the tape drawing mechanism chucks the leader pin.

1 Claim, 30 Drawing Sheets

U.S. PATENT DOCUMENTS

| | | |
|---|---|---|
| 6,191,920 B1 | 2/2001 | Hashizume et al. |
| 6,236,539 B1 | 5/2001 | Morita et al. |
| 6,349,016 B1 | 2/2002 | Morita et al. |
| 6,388,838 B1 | 5/2002 | Kaneda et al. |
| 6,445,539 B1 | 9/2002 | Morita et al. |
| 6,462,906 B2 | 10/2002 | Morita et al. |
| 6,491,246 B1 | 12/2002 | North et al. |
| 6,499,684 B2 * | 12/2002 | Eaton et al. ............. 242/332.4 |
| 6,629,656 B2 * | 10/2003 | Morita et al. ............ 242/332.4 |

* cited by examiner

FIG.34
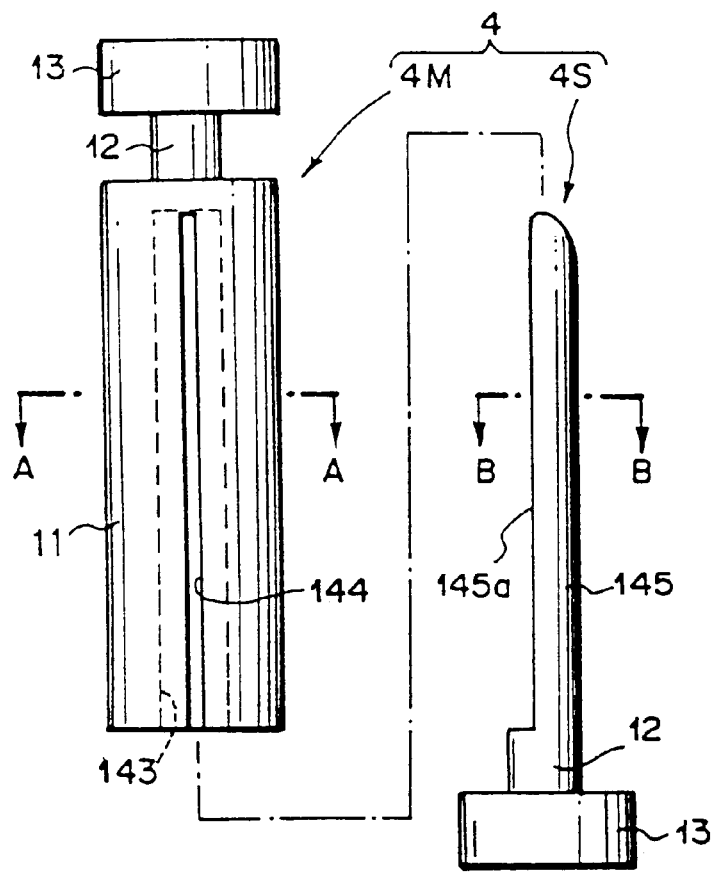
FIG.35A   FIG.35B
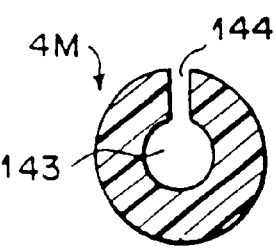
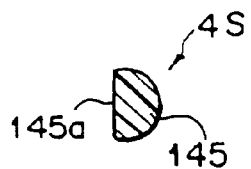

FIG. 41A
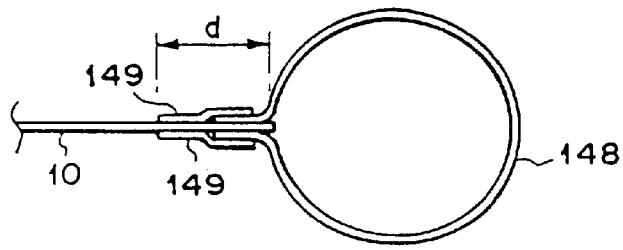
FIG. 41B
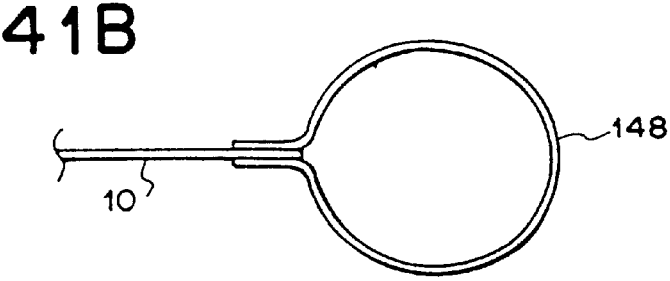
FIG. 42A
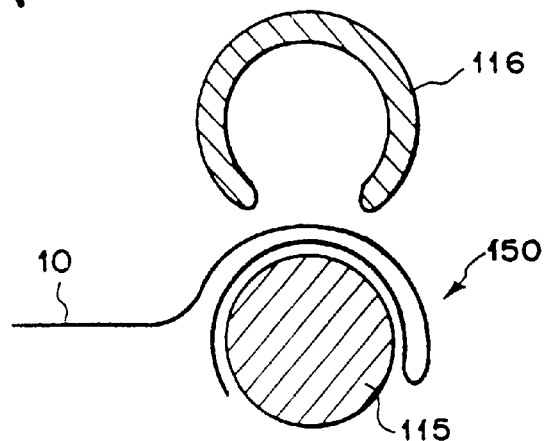
FIG. 42B
FIG. 42C
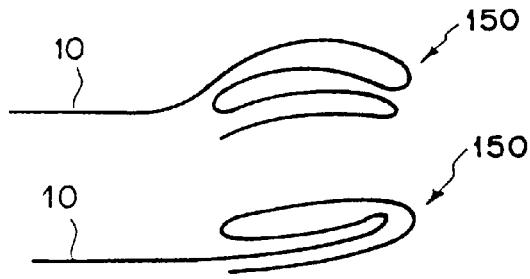

F I G. 53
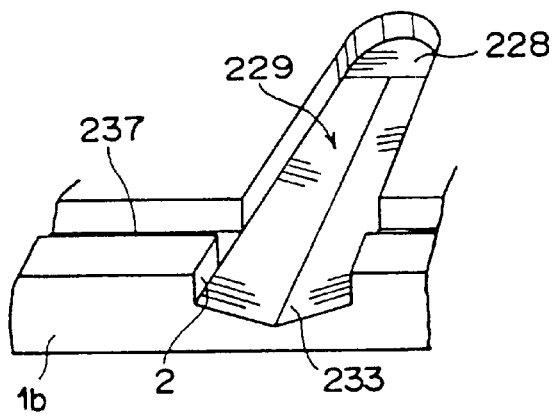
F I G. 54
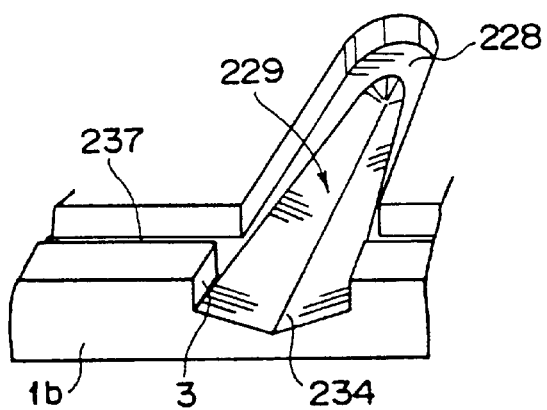
F I G. 55A
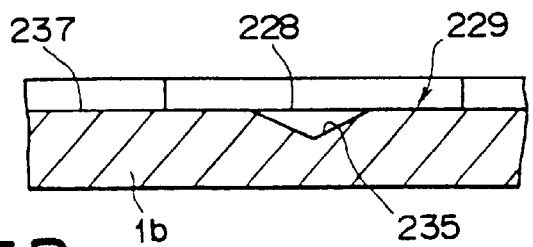
F I G. 55B
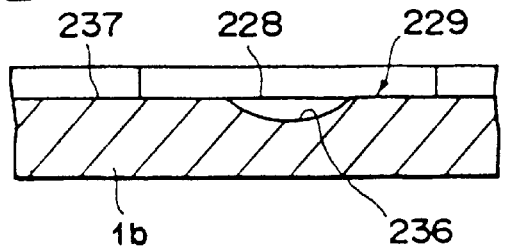

MAGNETIC TAPE CARTRIDGE

CROSS REFERENCE TO RELATED APPLICATIONS

This is a divisional of application Ser. No. 10/103,857 filed Mar. 25, 2002 now U.S. Pat. No. 6,629,656, (which is a divisional of application Ser. No. 09/852,635, filed May 11, 2001 now U.S. Pat. No. 6,462,906, which is a divisional of application Ser. No. 09/216,856, filed Dec. 21, 1998 now U.S. Pat. No. 6,349,016), the disclosure of which is incorporated herein by reference.

BACKGROUND OF THE INVENTION

1. Field of the Invention

This invention relates to a magnetic tape cartridge, and more particularly to a magnetic tape cartridge comprising a cartridge casing and a single reel around which a magnetic tape is wound and which is contained in the cartridge casing for rotation.

2. Description of the Related Art

There has been known a single reel magnetic tape cartridge comprising a flat cartridge casing which is formed by upper and lower shell halves and is substantially square in shape and a single reel around which a magnetic tape is wound and which is contained in the cartridge casing for rotation. Such a single reel magnetic tape cartridge has been used for retaining data of a computer or the like. A tape outlet opening is formed in a side wall of the cartridge casing and when the magnetic tape cartridge is used, i.e., when the magnetic tape cartridge is loaded in a recording and reproducing system as, for instance, an external storage for a computer and information is to be recorded on the magnetic tape or information recorded on the magnetic tape is to be read, the magnetic tape wound around the reel is drawn out through the tape outlet opening.

In such a magnetic tape cartridge of one type, a leader block is fixed to the leading end of a leader tape which is connected to the magnetic tape and when the magnetic tape cartridge is not used, the magnetic tape is fully wound, around the reel with the leader block fitted in the tape outlet opening to close the tape outlet opening. In the case of the magnetic tape cartridge of this type, when the magnetic tape cartridge is loaded in the recording and reproducing system, a drive means in the recording and reproducing system engages with engagement teeth on the reel exposed outside at the central portion of the lower casing half and a tape drawing mechanism in the recording and reproducing system chucks the leader block and draws the magnetic tape outside the cartridge casing into a tape running path of the recording and reproducing system.

In another type, the tape outlet opening is closed and opened by a lid which is rotatable between a closing position where it closes the tape outlet opening and an opening position where it opens the tape outlet opening, the lid being urged by a spring toward the closing position. A hook member is fixed to the leading end of a leader tape which is connected to the magnetic tape and when the magnetic tape cartridge is not used, the magnetic tape is fully wound around the reel with the hook member retracted inside the tape outlet opening and the lid held in the closing position. In the case of the magnetic tape cartridge of this type, when the magnetic tape cartridge is loaded in the recording and reproducing system, a drive means in the recording and reproducing system engages with engagement teeth on the reel exposed outside at the central portion of the lower casing half and a tape drawing mechanism in the recording and reproducing system moves the lid to the opening position, chucks the hook member and draws the magnetic tape outside the cartridge casing into a tape running path of the recording and reproducing system.

Recently, the recording and reproducing system (will be referred to as "tape drive system" hereinbelow) comes to require employment of a leader pin about 3 mm thick in place of the leader block or the hook member. However attempts at meeting such requirement have encountered a difficulty that it is difficult for the tape drawing mechanism in the tape drive system to surely chuck such a thin leader pin.

SUMMARY OF THE INVENTION

In view of the foregoing observations and description, the primary object of the present invention is to provide a magnetic tape cartridge which is provided with a leader pin which can be surely chucked by the tape drawing mechanism in the tape drive system.

In the following description, a term "a magnetic tape" sometimes means "a magnetic tape with a leader tape connected thereto".

The magnetic tape cartridge in accordance with the present invention comprises a cartridge casing, a single reel around which a magnetic tape is wound and which is contained in the cartridge casing for rotation, and a leader pin fixed to the leading end portion of the magnetic tape and is characterized in that the leader pin is provided at its opposite ends with engagement portions which are brought into engagement with a tape drawing mechanism of a recording and reproducing system when the magnetic tape cartridge is loaded in the recording and reproducing system, and the end face of each engagement portion is provided with a recess at which the tape drawing mechanism chucks the leader pin.

With this arrangement, though simple in structure, the tape drawing mechanism of the recording and reproducing system can surely chuck the leader pin.

It is preferred that each engagement portion be provided with a smaller diameter portion and a flange on the outer side of the smaller diameter portion and the recess be formed on the outer end face of the flange at the center thereof.

For example, the leader pin may comprise a body portion provided with the aforesaid engagement portions at its opposite ends and a clamp member which is press-fitted on the body portion sideways with the leading end portion of the magnetic tape sandwiched therebetween.

With this arrangement, the leader pin can be easily fixed to the leading end portion of the magnetic tape.

BRIEF DESCRIPTION OF THE DRAWINGS

FIG. 34 is an exploded side view of a fourteenth specific example of the leader pin, FIGS. 35A and 35B are cross-sectional views taken along lines A—A and B—B in FIG. 34, FIGS. 36A to 36C are cross-sectional views for illustrating tape clamping operation of the fourteenth example, FIGS. 41A and 41B are views showing different manners of connecting the leader tape to the magnetic tape, FIGS. 42A to 42C are views showing different manners of clamping the leading end portion magnetic tape by the leader pin of the preceding examples, FIG. 52 is a fragmentary perspective a modification of the guide surface, FIG. 53 is a fragmentary perspective view showing another modification of the guide surface, FIG. 54 is a fragmentary perspective view showing still another modification of the guide surface, FIG. 55A is a fragmentary cross-sectional view showing still another modification of the guide surface, and FIG. 55B is a fragmentary cross-sectional view showing still another modification of the guide surface.

DESCRIPTION OF THE PREFERRED EMBODIMENTS

Figure 1:
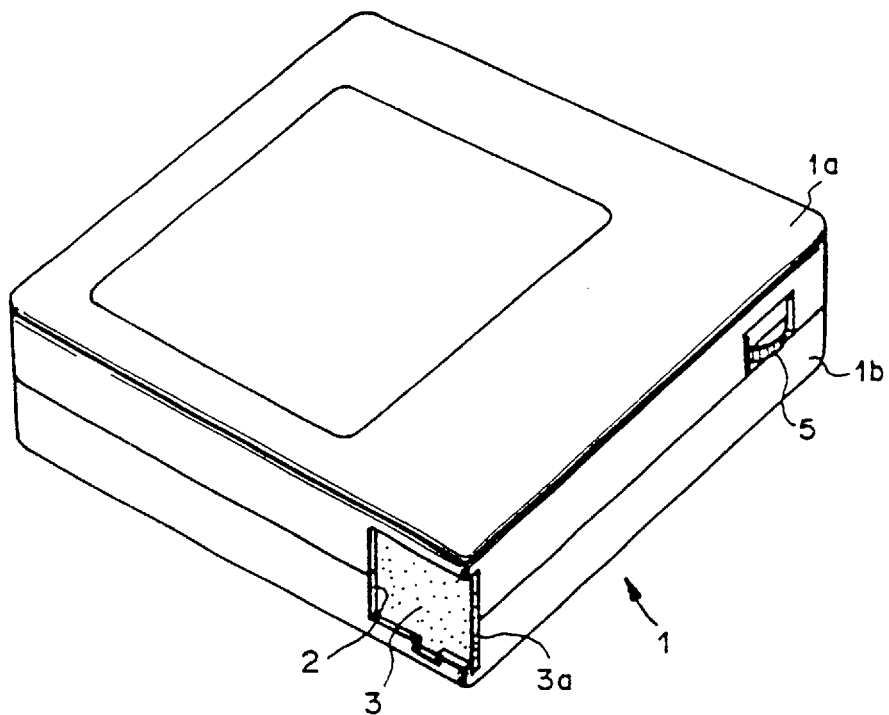
FIG. 1 is a perspective view showing a magnetic tape cartridge in accordance with an embodiment of the present invention with the slide door closed.
Figure 2:
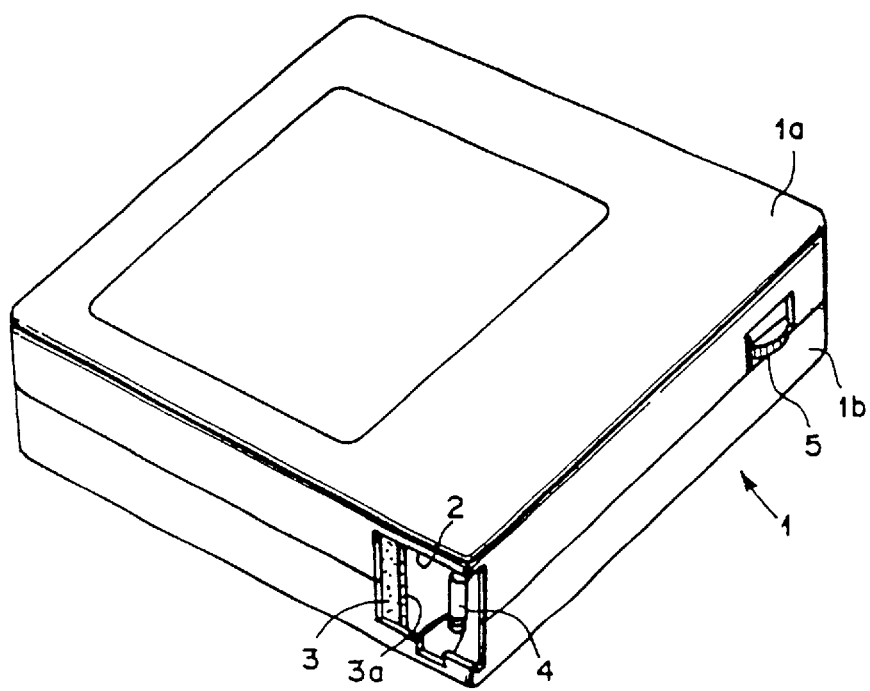
FIG. 2 is a perspective view showing the magnetic tape cartridge with the slide door opened.

In FIGS. 1 and 2, a magnetic tape cartridge in accordance with an embodiment of the present invention comprises a cartridge casing 1 formed by upper and lower casing halves 1a and 1b and a single reel (not shown) around which a magnetic tape is wound and which is supported for rotation in the cartridge casing 1. A tape outlet opening 2 through which the magnetic tape is drawn out is formed in one end face of the cartridge casing 1 near a corner thereof. A slide door 3 for opening and closing the tape outlet opening 2 is mounted in the cartridge casing 1 to be slidable back and forth between a closing position where it closes the tape outlet opening 2 and opening position where it opens the same. The slide door 3 is urged toward the closing position by a spring not shown disposed between a side face of the cartridge casing 1 and the slide door 3.

As shown in FIG. 2, a leader pin 4 fixed to the leading end of the magnetic tape is held inside the tape outlet opening 2. When the magnetic tape cartridge is loaded in a tape drive system, a reel drive means of the tape drive system is brought into engagement with engagement teeth (not shown) on the reel which is exposed in the bottom face of the cartridge casing 1 at the center thereof and a tape drawing mechanism of the tape drive system pushes the front end face 3a of the slide door 3 to open the slide door 3. Further the tape drawing mechanism chucks the leader pin 4 and pulls the leader pin 4 into the system, whereby the magnetic tape is set in the tape drive system so that data can be recorded on or read out from the magnetic tape.

A knob 5 for inhibiting erasure and write projects outside in one side face of the cartridge casing 1.

Figure 3:
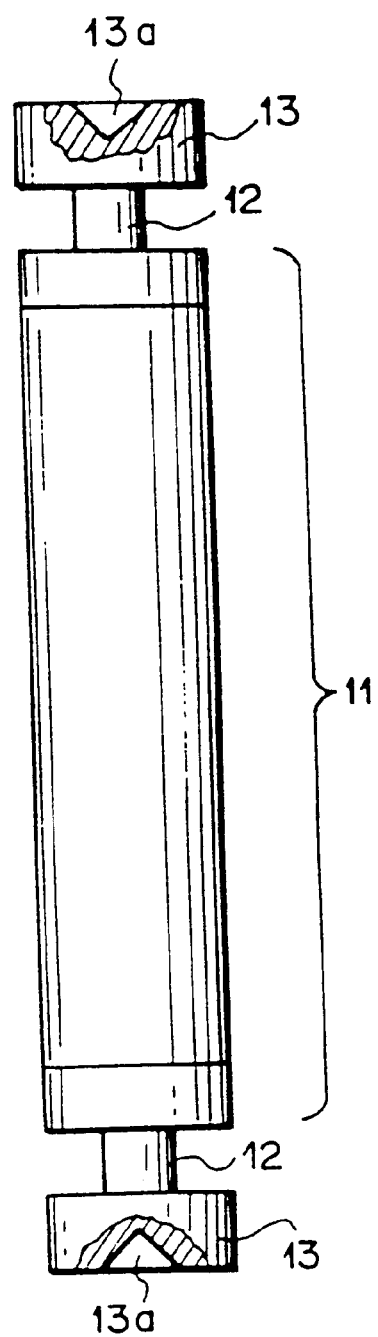
FIG. 3 is a side view partly cutaway showing a basic appearance of the leader pin.

As shown in FIG. 3, the leader pin 4 basically comprises a main portion 11 at which the leading end portion of the magnetic tape is clamped, a pair of small diameter portions 12 which extend from the upper and lower end of the main portion 11 and a pair of flanges 13 which are formed on the outside of the small diameter portions 12. The small diameter portions 12 form an engagement portions which are brought into engagement with the tape drawing mechanism of the tape drive system. Each of the flanges 13 is provided at the center of its end face with a conical recess 13a at which the tape drawing mechanism chucks the leader pin 4. The main portion 11 is substantially equal in length to the width (½ inches) of the magnetic tape.

Figure 4A:
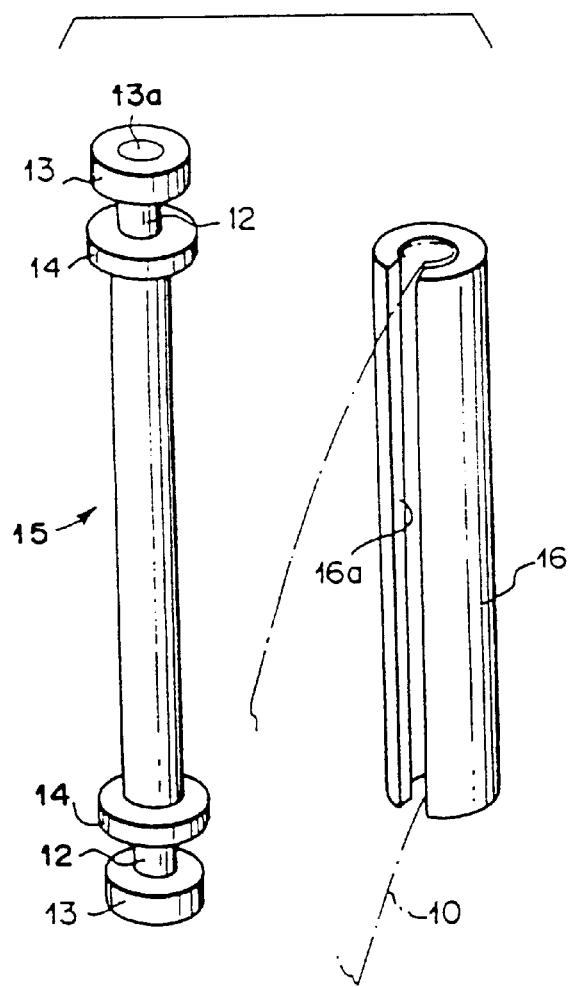
FIG. 4A is an exploded perspective view of a first specific example of the leader pin.
Figure 4B:
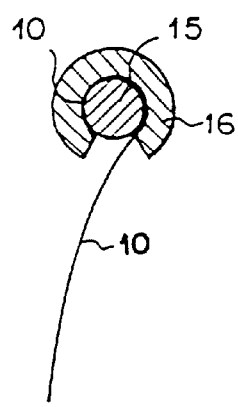
FIG. 4B is a cross-sectional view of the leader pin.

Examples of the specific structure of the leader pin 4 will be described, hereinbelow. FIG. 4A is an exploded perspective view of the leader pin 4 of a first example and FIG. 4B is a cross-sectional view of the same. As shown in FIGS. 4A and 4B, the leader pin 4 of the first example comprises a body portion 15 of metal or hard plastic and a clamp member 16 of metal or hard plastic. The body portion 15 has a relatively thick middle portion, a pair of inner flanges 14 on opposite ends of the middle portion, a pair of small diameter portions 12 on the upper and lower sides of the inner flanges 14 and a pair of outer flanges 13 on the upper and lower sides of the small diameter portions 12. The clamp member 16 has an axial hole which extends over the entire length of the clamp member 16 and opens outward through a slit 16a extending over the entire length of the clamp member 16. The clamp member 16 is press-fitted on the middle portion of the body portion 15 between the inner flanges 14 through the slit 16a with the leading end portion of the magnetic tape 10 pinched between the inner wall surface of the axial hole of the clamp member 16 and the outer surface of the middle portion of the body portion 15a, whereby the leading end portion of the magnetic tape 10 is fixed to the leader pin 4.

With this arrangement, the leading end portion of the magnetic tape 10 can be easily and surely fixed to the leader pin 4, and the conical recesses on the outer flanges 13 makes it feasible for the tape drawing mechanism of the tape drive system to surely chuck the leader pin 4.

The clamp member 16 may be formed of shape memory alloy instead of elastic material. In this case, the clamp member 16 is heated and fitted on the middle portion of the body portion 15 between the inner flanges 14 through the slit 16a with the leading end portion of the magnetic tape 10 pinched between the inner wall surface of the axial hole of the clamp member-16 and the outer surface of the middle portion of the body portion 15. Thereafter the clamp member 16 is cooled to normal temperatures, whereby the axial hole of the clamp member 16 is reduced in its inner diameter under shape memory effect and the leading end portion of the magnetic tape 10 is clamped on the outer surface of the body portion 15.

Examples of the specific structures of the leader pin which are provided with a tape positioning means for positioning the leading end portion of the magnetic tape 10 with respect to the leader pin will be described, hereinbelow.

Figure 5:
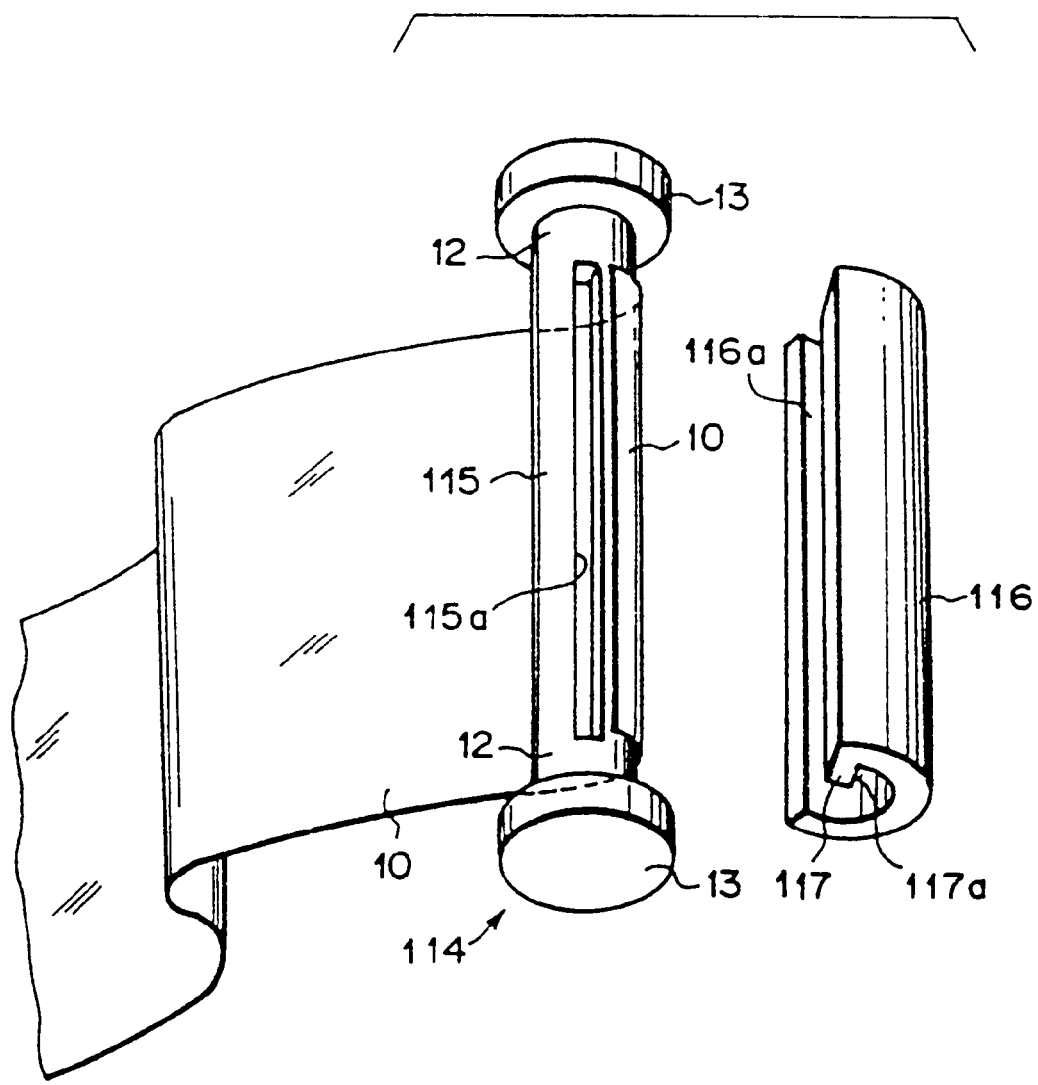
FIG. 5 is an exploded perspective view of a second specific example of the leader pin.

FIG. 5 shows a leader pin of a second example. As shown in FIG. 5, the leader pin of this example comprises a pin body 114 of metal or hard plastic. The pin body 114 has a pair of flanges 13 on opposite ends thereof and a shaft portion 115 which extends between the flanges 113 and is substantially uniform in diameter. A resilient clamp member 116 which is larger than the shaft portion 115 in outer diameter and is smaller than the shaft portion 115 in length is press-fitted on the middle portion of the shaft portion 115. When the clamp member 116 is press-fitted on the middle portion of the shaft portion 115, the small diameter portions 12 (FIG. 3) are formed on opposite sides of the clamp member 116. A groove 115a is formed on the shaft portion 115 to extend in the longitudinal direction of the pin body 114.

The clamp member 116 has an axial hole which extends over the entire length of the clamp member 116 and opens outward through a slit 116a extending over the entire length of the clamp member 116. A flange 117 is formed on one edge of the slit 116a of the clamp member 116 to project toward the longitudinal axis of the clamp member 116.

Figure 6A:
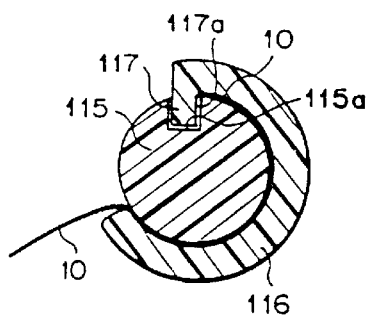
FIG. 6A is a cross-sectional view of the second specific example of the leader pin in an assembled stated.

The clamp member 116 is press-fitted on the shaft portion 115 of the pin body 114 with the flange 117 engaged with the groove 115a as shown in FIG. 6A. By bringing the leading edge of the magnetic tape 10 into abutment against the inner surface 117a of the flange 117 when clamping the leading end portion of the magnetic tape 10 between the pin body 114 and the clamp member 116, the magnetic tape 10 can be easily positioned with respect to the leader pin 4. It is preferred that the clamp member 116 be formed of deposition hardened steel such as SUS631 in order to increase resiliency of the clamp member 116.

In the case of this example, since the shaft portion 115 of the pin body 114 is circular in cross-section, the main portion 11 (FIG. 3) formed by fitting the clamp member 116 on the shaft portion 115 cannot be circular in cross-section.

Figure 6B:
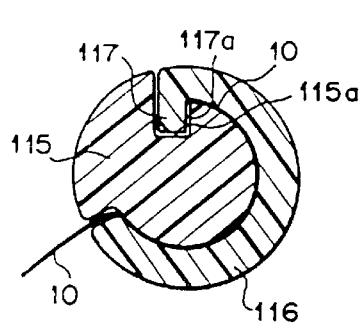
FIG. 6B is a view similar to FIG. 6A but showing a modification of the second example.

When the shaft portion 115 is in such a shape that forms circular cross-section together with the clamp member 116 as shown in FIG. 6B, the main portion 11 formed by fitting the clamp member 116 on the shaft portion 115 can be circular in cross-section.

Figure 6C:
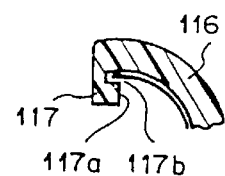
FIG. 6C is fragmentary cross-sectional illustrating another modification of the second

Further by forming a groove 117b on the base of the inner surface 117a of the flange 117 and inserting the leading end of the magnetic tape 10 in the groove 117b as shown in FIG. 6C, positioning of the leading end portion of the magnetic tape 10 with respect to the leader pin can be more facilitated.

Figure 7:
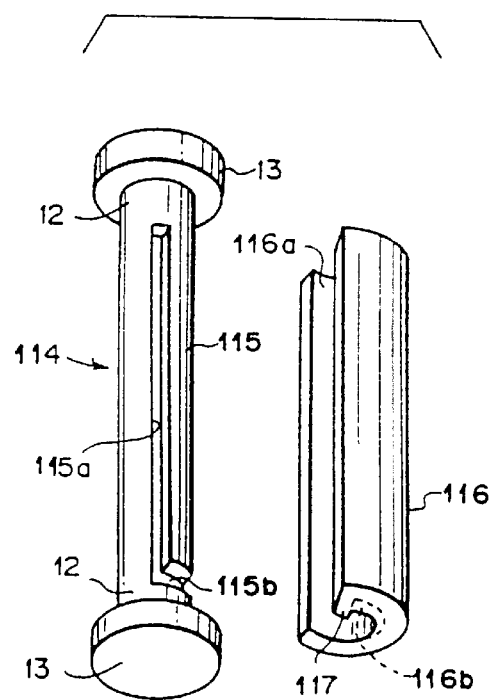
FIG. 7 is an exploded perspective view another modification of the second example.

Further when a short groove 115b is formed on the shaft portion 115 in perpendicular to the groove 115a to be connected to the groove 115a at one end thereof and a projection 116b is formed on the clamp member 116 at one end as shown in FIG. 7 so that the projection 116b is received in the short groove 115b when the clamp member 116 is fitted on the pin body 114, positioning of the magnetic tape 10 with respect to the leader pin in the axial direction thereof can be facilitated by bringing a side edge of the magnetic tape 10 into abutment against the projection 116b.

Figure 8:
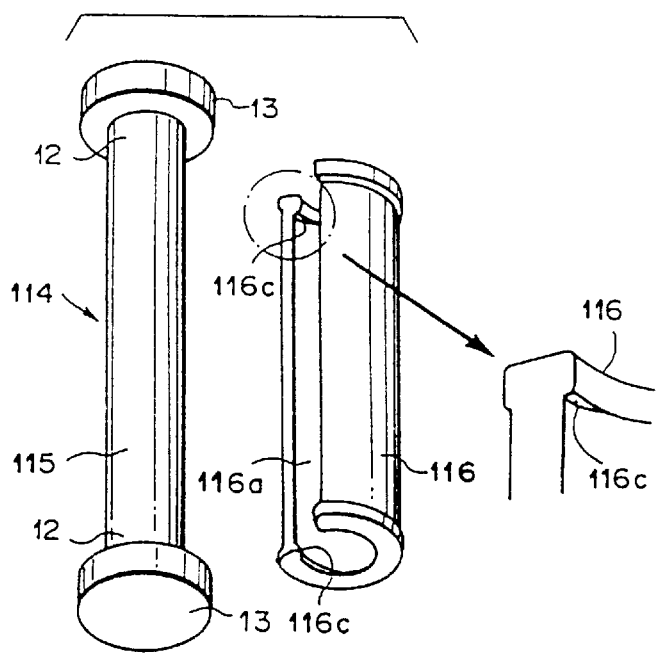
FIG. 8 is an exploded perspective view specific example of the leader pin.

FIG. 8 shows a leader pin of a third embodiment in which positioning of the magnetic tape 10 with respect to the leader pin in the axial direction thereof is facilitated. The leader pin of this example differs from that of the second example in that the shaft portion 115 is not provided with the groove 115a and accordingly the clamp member 116 is not provided with the flange 117, and instead the clamp member 116 is provided with a pair of arcuate shoulders 116c extending from the slit 116a on opposite ends of the clamp member 116. The magnetic tape 10 is positioned with respect to the leader pin in the axial direction of the leader pin, i.e., in the transverse direction of the magnetic tape 10, by bringing the side edges of the magnetic tape 10 into abutment against the shoulders 116c.

Figure 9:
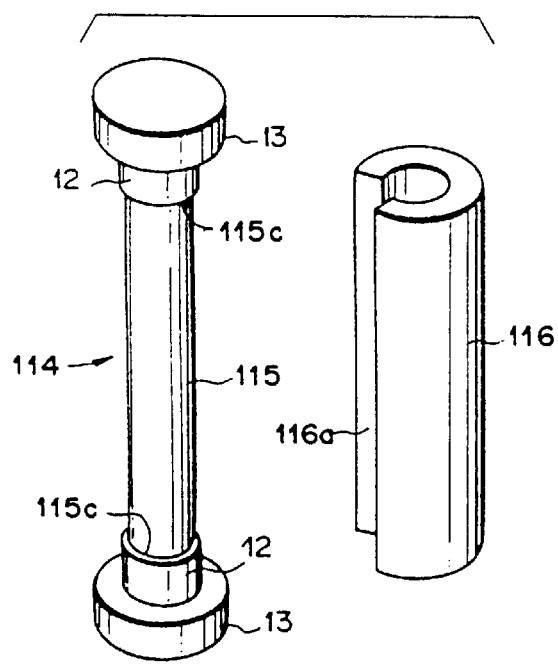
FIG. 9 is an exploded perspective view of a fourth specific example of the leader pin.

In the fourth example shown in FIG. 9, the outer diameter of the shaft portion 115 is slightly smaller than that of the small diameter portions 12 and shoulders 115c are formed between the shaft portion 115 and each of the small diameter portion 12. The magnetic tape 10 is positioned with respect to the leader pin in the axial direction of the leader pin by use of the shoulder 115c.

Figure 10:
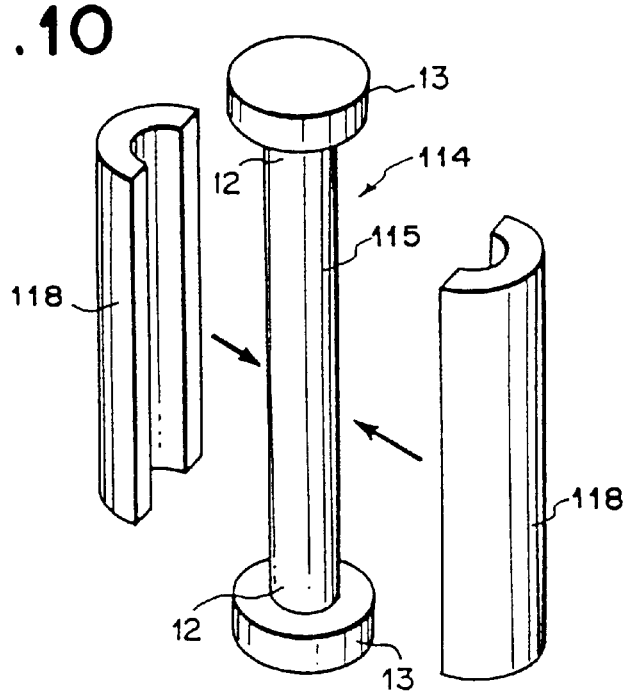
FIG. 10 is an exploded perspective view of a fifth specific example of the leader pin.
Figure 11A:
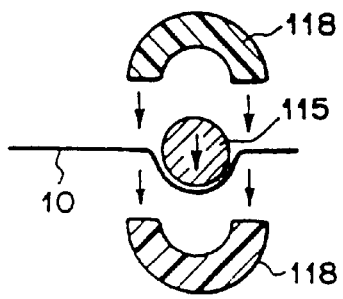
FIG. 11A is an exploded cross-sectional view of the fifth example.
Figure 11B:
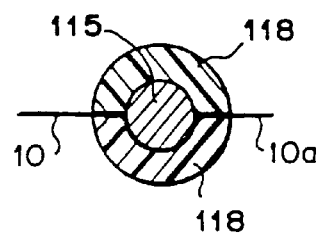
FIG. 11B is a cross-sectional view of the fifth example in an assembled state.
Figure 12A:
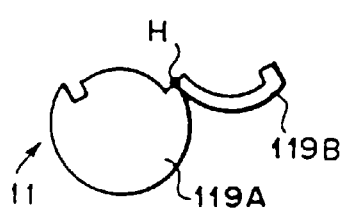
FIGS. 12A and 12B are schematic cross-sectional views for illustrating a sixth specific example of the leader pin.
Figure 12B:
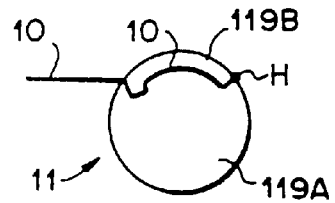
Figure 13A:
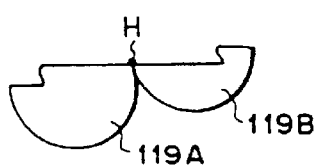
FIGS. 13A and 13B are schematic cross-sectional views for illustrating a modification of the sixth specific example.
Figure 13B:
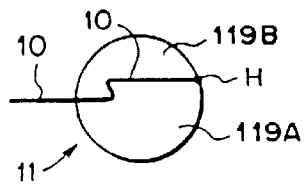
Figure 14A:
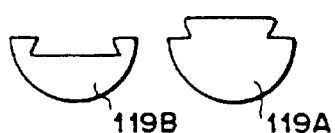
FIGS. 14A and 14B are schematic cross-sectional views for illustrating another modification of the, sixth specific example.
Figure 14B:
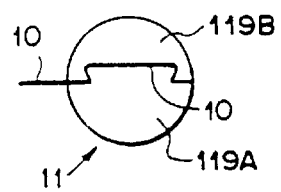

In the fifth example shown in FIG. 10, the pin body 114 is the same as that shown in FIG. 8 but the magnetic tape 10 is fixed to the leader pin by a pair of split clamp members 118 of plastic. That is, the clamp members 118 are semi-cylindrical in shape and are fixed together by adhesive with the pin body 114 and the leading end portion of the magnetic tape 10 intervening therebetween as shown in FIGS. 11A and 11B. The tip of the leading end portion of the magnetic tape 10 projecting outside the clamp members 118 is cut after bonding the clamp members 118. The leader pin of this example is easy to manufacture and is advantageous in that positioning of the magnetic tape 10 is easy.

As a sixth example of the leader pin and its modifications, the main portion 11 may be formed of pair of members 119A and 119B which are brought into resilient engagement with each other with the leading portion of the magnetic tape 10 pinched therebetween as shown in FIGS. 12A and 12B, 13A and 13B and 14A and 14B, respectively. In the examples shown in FIGS. 12A and 12B and 13A and 13B, the members 119A and 119B are hinged to each other at H and the example shown in FIGS. 14A and 14B, the members 119A and 119B are separate from each other.

Figure 15:
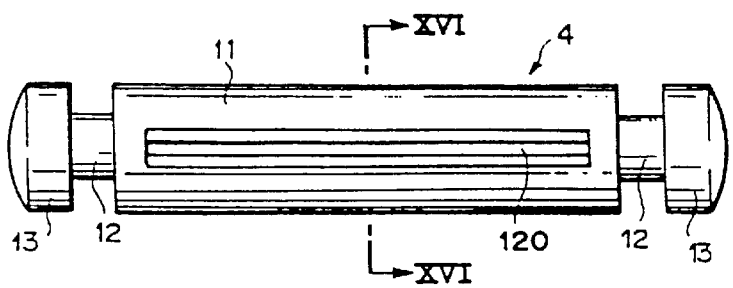
FIG. 15 is a schematic side view of a seventh specific example of the leader pin.
Figure 16A:
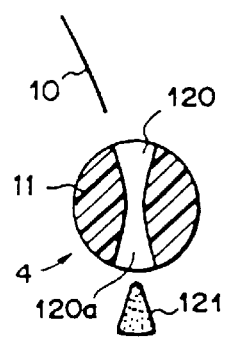
FIGS. 16A and 16B are cross-sectional views taken along line XVI—XVI in FIG. 15 before and after clamping the magnetic tape.
Figure 16B:
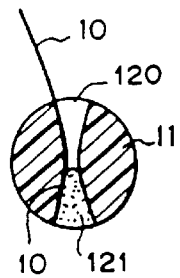

In the seventh example shown in FIGS. 15, 16A and 16B, the main portion 11 of the leader pin 4 is formed with a slit 120 diametrically through the main portion 11. The slit 120 is flared in cross-section from the center of the main portion 11 toward the opening 120a on the side opposite to the side from which the leading end portion of the magnetic tape 10 is inserted into the slit 120. After the magnetic tape 10 is inserted into the slit 120, a wedge-shaped clamp member 121 is press-fitted in the slit 120 from the opening 120a, thereby clamping the magnetic tape 10 on the main portion 11 as shown in FIG. 16A. This example is advantageous in that the leader pin 4 can be simple in structure. It is preferred that the wedge-shaped clamp member 121 be substantially the same in the radius of curvature of the outer surface thereof as that of the leader pin 4.

Figure 17A:
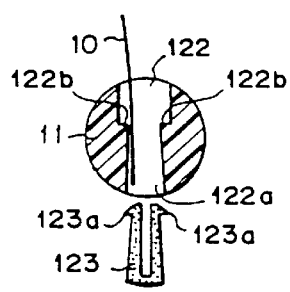
FIGS. 17A and 17B are views similar to FIGS. 16A and 16B but showing a modification of the seventh example.
Figure 17B:
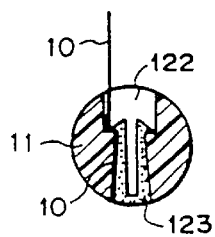

In a modification of the seventh example shown in FIGS. 17A and 17B, a bifurcated wedge-shaped clamp member 123 is used. The clamp member 123 is provided with a pair of hooks 123a on the tips of the arms and the main portion 11 of the leader pin 4 is provided with a slit 122 which is flared in cross-section from the center of the main portion 11 toward the opening 122a on the side opposite to the side from which the leading end portion of the magnetic tape 10 is inserted into the slit 122 and is provided with a pair of shoulders 122b. When the clamp member 123 is press fitted in the slit 122 from the opening 122a, the arms of the member 123 is once resiliently bent toward each other and then spring away from each other into engagement with the shoulders 122b, whereby the clamp member 123 and the magnetic tape 10 are prevented from being disengaged from the slit 122.

Figure 18A:
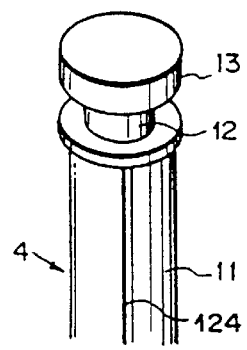
FIG. 18A is a fragmentary perspective view of an eighth specific example of the leader pin.
Figure 18B:
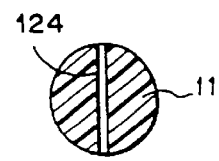
FIG. 18B is a cross-sectional view of the eighth example.
Figure 18C:
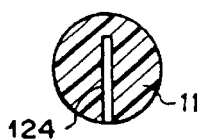
FIG. 18C is a view similar to FIG. 18B but showing a modification of the eighth example.
Figure 18D:
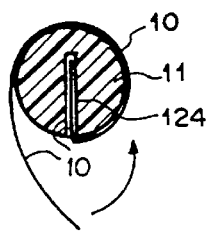
FIG. 18D is a cross-sectional view showing the leading end portion of the magnetic tape wound around the leader pin.

In the eighth example shown in FIGS. 18A to 18D, a slit 124 is formed in the main portion 11 of the leader pin 4 and the leading end portion of the magnetic tape 10 is inserted into the slit 124. The magnetic tape 10 is held on the leader pin 4 by winding the magnetic tape 10 around the main portion 11 with the leading end portion inserted into the slit 124 as shown in FIG. 18D. In this example, the slit 124 may extend either through the main portion 11 as shown in FIG. 18B or not through the main portion 11 as shown in FIG. 18C.

Figure 19A:
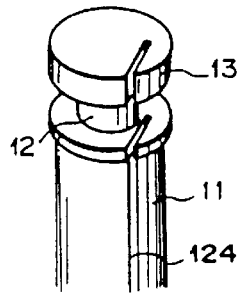
FIG. 19A is fragmentary perspective view of another modification of the eighth example.
Figure 19B:
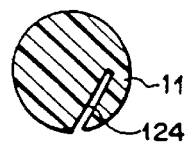
FIG. 19B is a cross-sectional view of the modification.
Figure 19C:
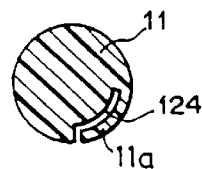
FIG. 19C is a view similar to FIG. 19B but showing a still another modification of the eighth example.

The slit 124 may reach the flanges 13 as shown in FIGS. 19A and 19B so that the slit 124 can be easily formed, for instance, by wire cutting. Further the slit 124 may be formed so that a thin portion ha is formed on the outer side of the slit 124 as shown in FIG. 19C and the magnetic tape 10 may be held in the slit 124 under the resiliency of the thin portion 11a.

Figure 20:
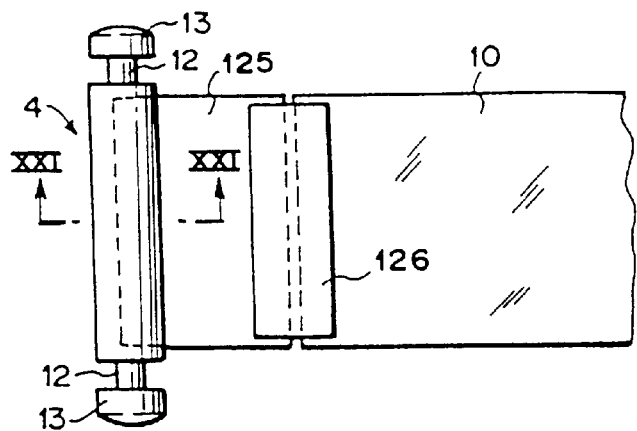
FIG. 20 is a side view of a ninth example of the leader pin.
Figure 21A:
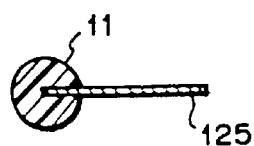
FIGS. 21A to 21C are cross-sectional views taken along line XXI—XXI in FIG. 20 showing variations of manner of connecting the leader tape to the leader pin.

In the ninth example shown in FIG. 20, the magnetic tape 10 is connected to a temperature-resistant connecting sheet 125. That is, the leader pin 4 is formed by plastic molding and when the leader pin 4 is molded, the connecting sheet 125 is inserted so that the connecting sheet 125 is projected from the leader pin 4 as shown in FIG. 21A. The connecting sheet 125 is substantially equal in width to the magnetic tape 10 and the leading end portion of the magnetic tape 10 is connected to the connecting sheet 125, for instance, by use of splicing tape 126.

Figure 21B:
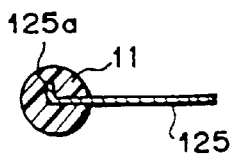
Figure 21C:
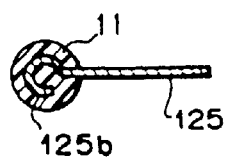
Figure 21D:
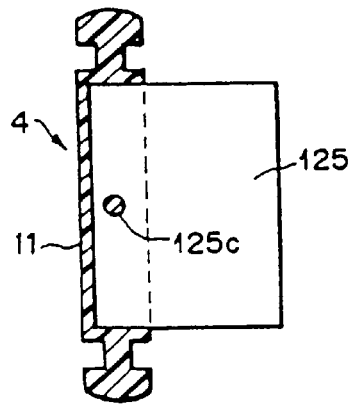
FIG. 21D is a vertical cross-sectional view of FIG. 20 showing another variation of manner of connecting the leader tape to the leader pin.

By forming a bent portion 125a or 125b in the end portion of the connecting tape 125 as shown in FIG. 21B or 21C or forming a small opening 125c in the end portion of the connecting tape 125 as shown in FIG. 21D, bonding strength of the connecting sheet 125 to the leader pin 4 can be increased.

Figure 22:
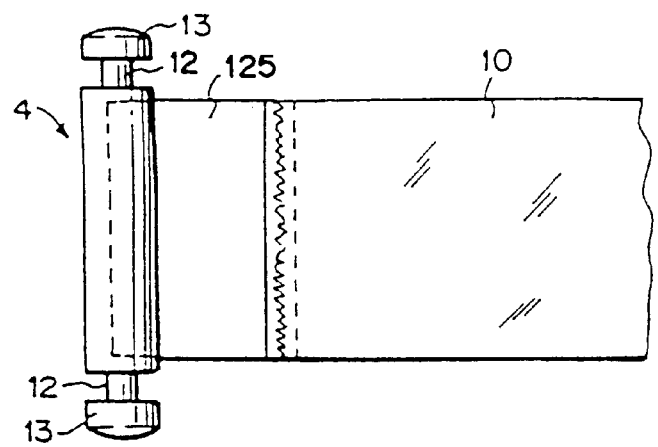
FIG. 22 is a side view showing a modification of the ninth example.

The magnetic tape 10 may be bonded to the connecting sheet 125 by heat-sensitive adhesive as shown in FIG. 22.

Figure 23:
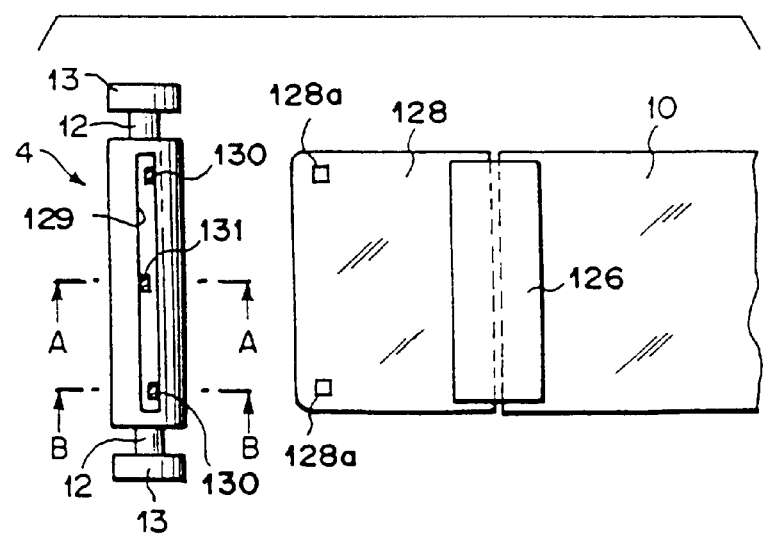
FIG. 23 is an exploded side view of a tenth specific example of the leader pin.

In the tenth example shown in FIG. 23, a leader tape 128 such as photographic film which has suitable strength and rigidity is connected to the leading end of the magnetic tape 10, for instance, by use of splicing tape 126 and a slit 129 is formed in the leader pin 4. The leader tape 128 is provided with a pair of engagement holes 128a on upper and lower edges thereof.

Figure 24A:
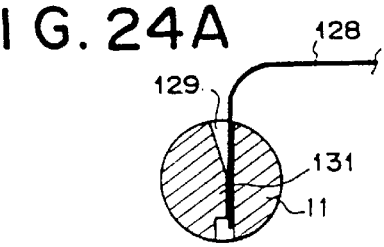
FIG. 24A is a cross-sectional view taken along line A—A in FIG. 23.
Figure 24B:
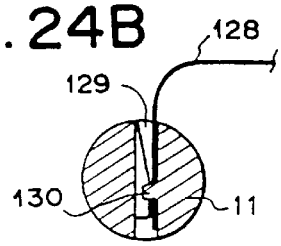
FIG. 24B is a cross-sectional view taken along line B—B in FIG. 23.

Further as shown in FIGS. 24A and 24B, a pair of engagement projections 130 projects from one side wall of the slit 129 and a retainer projection 131 projects from the other side wall of the slit 129 at the middle between the engagement projections 130. The leader tape 128 is inserted into the slit 129 and the engagement holes 128a are brought into engagement with the engagement projections 130 as shown in FIG. 24A. The retainer projection 131 pushes the leader tape 128 toward the engagement projections 130, thereby preventing the engagement holes 128a from being disengaged from the engagement projections 130 as shown in FIG. 24B. This example is advantageous in that the leader tape 128 can be easily connected to the leader pin 4.

Figure 25A:
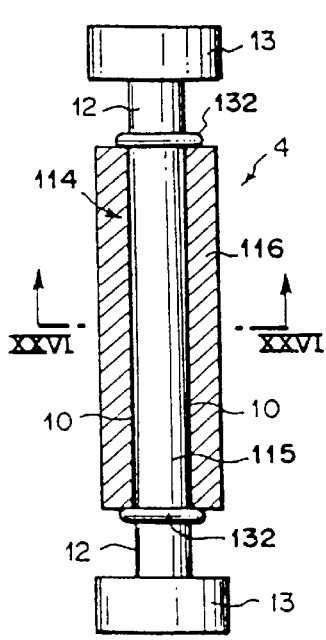
FIG. 25A is a vertical cross-sectional view of a eleventh example of the leader pin.
Figure 25B:
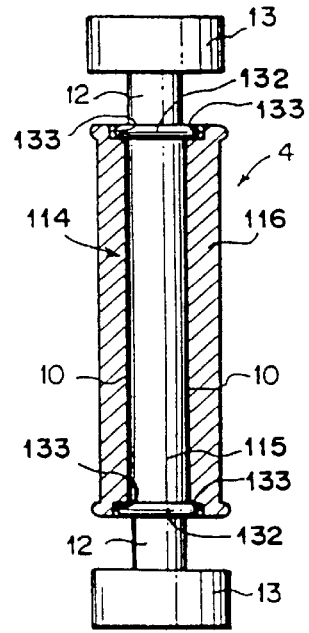
FIGS. 25B and 25C are views similar to FIG. 25A but showing modifications of the eleventh example.
Figure 25C:
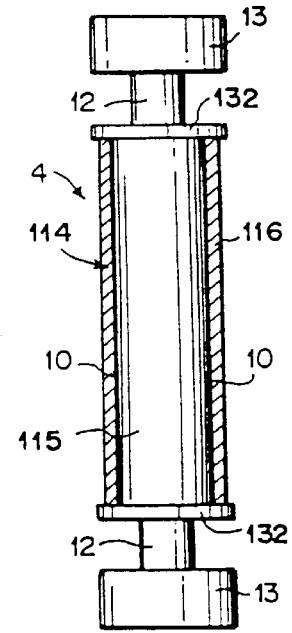
Figure 26:
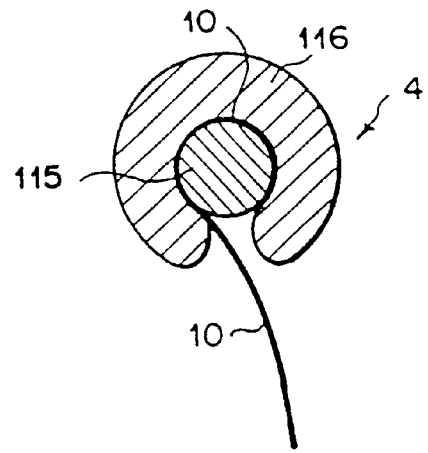
FIG. 26 is a cross-sectional view taken along line XXVI—XXVI in FIG. 25A.

In the eleventh example shown in FIGS. 25A to 25C, the pin body 114 is provided with a pair of inner flanges 132 which separates the shaft portion 115 from the small diameter portions 12 and a clamp member 116 which is C-shaped in cross-section is press-fitted on the shaft portion 115 between the inner flanges 132 as shown in FIG. 26. The inner flanges 132 are spaced from each other by a distance substantially equal to the width of the magnetic tape 10 and are used to position the magnetic tape 10 with respect to the leader pin 4.

Figure 27:
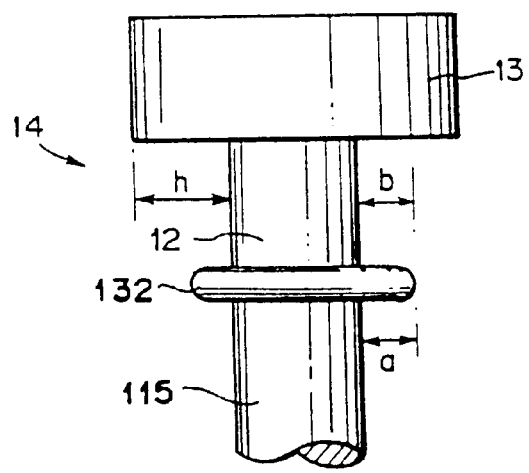
FIG. 27 is a view for illustrating the dimensions of important parts of the eleventh example.

When the distance between the outer surface of the small diameter portion 12 and the outer surface of the outer flange 13 is represented by h, the distance between the outer surface of the shaft portion 115 and the outer surface of the inner flange 13 is represented by a, and the distance between the outer surface of the small diameter portion 12 and the outer surface of the inner flange 132 is represented by b as shown in FIG. 27, at least one of a and b is not larger than 2 h/3 in any one of the leader pins shown in FIGS. 25A to 25C.

In the leader pin shown in FIG. 25A, the outer diameter of the shaft portion 115 is equal to that of the small diameter portion 12 and a=b≦2 h/3. The clamp member 116 has a length slightly smaller than the distance between the inner flanges 132.

In the leader pin shown in FIG. 25B, the outer diameter of the shaft portion 115 is also equal to that of the small diameter portion 12 but the clamp member 116 has a length substantially equal to the distance between the inner flanges 132. The clamp member 116 is provided with an annular recess 133 at each end face thereof and the inner flanges 132 are received in the recesses 133 when the clamp member 116 is fitted on the pin body 114.

In the leader pin shown in FIG. 25C, the diameter of the inner flanges 132 is substantially equal to that of the outer flanges 13 and accordingly b=h. However since the shaft portion 115 is larger in diameter than the small diameter portions 12, a≦2 h/3. Accordingly, the clamp member 116 is thinner than that employed in the leader pin shown in FIG. 25A or 25B and is formed of hoop (stainless steel or the like is preferred in view of resistance to corrosion and/or hardness to magnetize.

Figure 28:
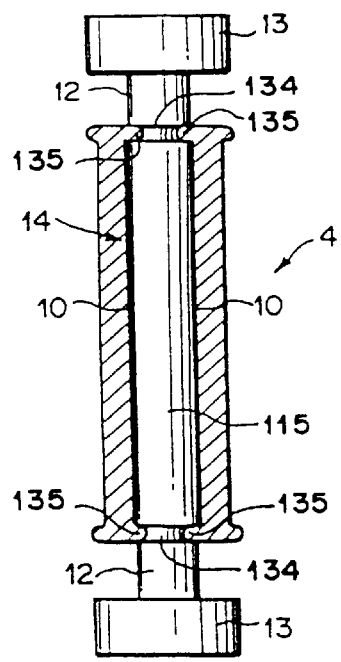
FIG. 28 is a vertical cross-sectional view of a twelfth example of the leader pin.
Figure 29:
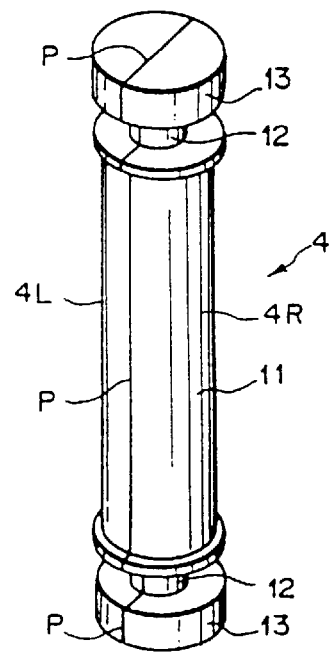
FIG. 29 is a perspective view of a thirteenth example of the leader pin.

Thus in the leader pins of this example, positioning of the magnetic tape 10 and the clamp member 116 is facilitated by virtue of the inner flanges 132 and at the same time even if the inner flanges 132 are small in thickness (about 0.4 to 0.6 mm), there arises no problem with respect to the strength and/or productivity of the leader pins since the height of the inner flanges 132 from the outer surface of the shaft portion 115 and/or the small diameter portions 12 satisfies the aforesaid condition. In the twelfth example shown in FIG. 28, a pair of annular recesses 134 are formed on the pin body 112 between the shaft portion 115 and the small diameter portions 12, and a pair of annular protrusions 135 are formed on the inner peripheral surfaces of the clamp member 116 at the ends thereof. The annular protrusions 135 are received in the annular recesses 134 on the pin body 114 when the clamp member 116 is fitted on the pin body 114.

With this arrangement, the clamp member 116 can be accurately positioned with respect to the pin body 114. Further the magnetic tape 10 can be accurately positioned with respect to the leader pin 4 by virtue of the annular protrusions 135 on the clamp member 116. Further the annular protrusions 135 protects the side edges of the magnetic tape 10 when the tape drawing mechanism of the tape drive system is brought into engagement with the small diameter portions 12. Further since the inner flanges are not used, problems which arise when inner flanges small in thickness and large in height are used can be avoided.

In the thirteenth example shown in FIGS. 29 to 32, the leader pin 4 is formed by left and right pin halves 4L and 4R which are butted together along a plane P including the longitudinal axis of the leader pin 4.

Figure 30:
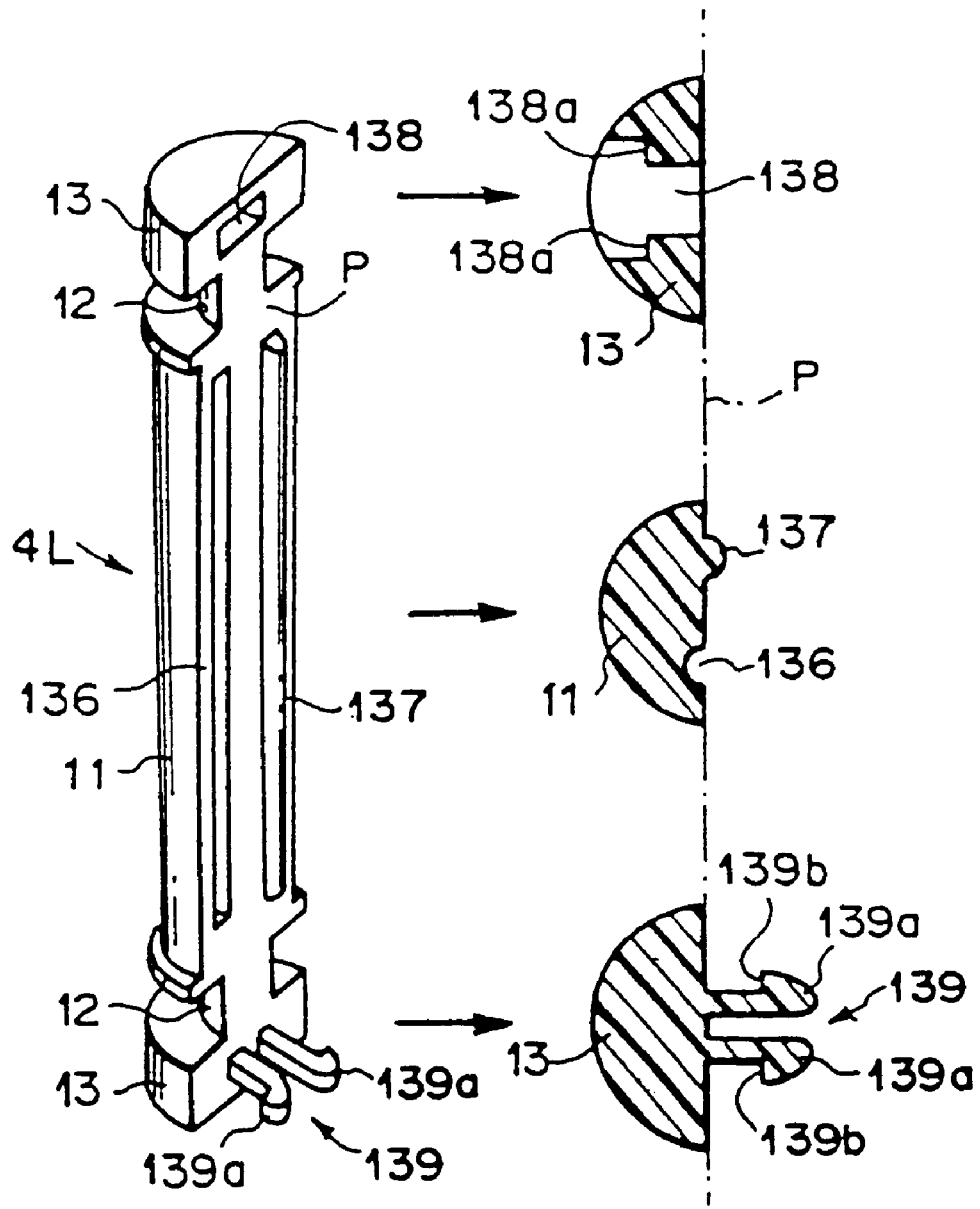
FIG. 30 is a perspective view of the pin half in the thirteenth example.
Figure 31:
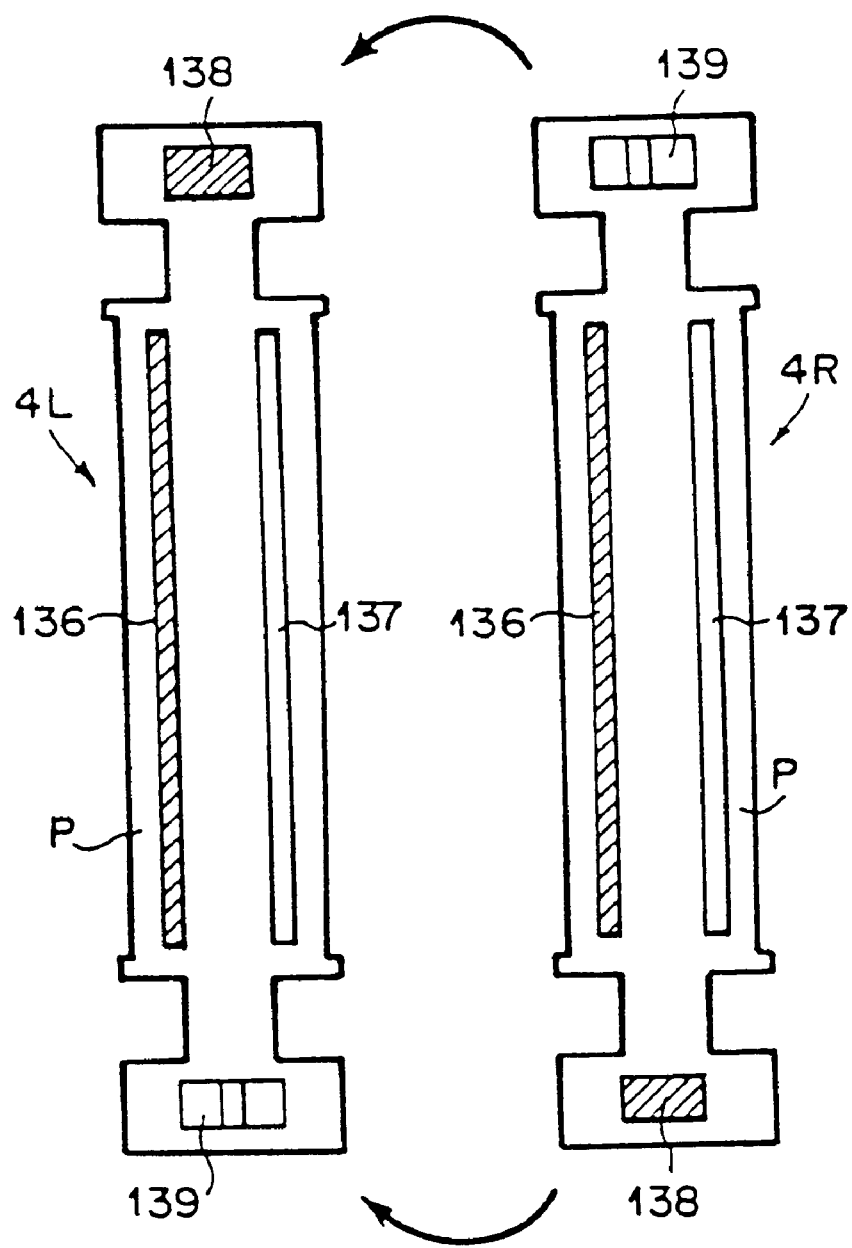
FIG. 31 is an exploded side view of the leader pin of the thirteenth example.

As shown in FIG. 30, the left pin half 4L has an elongated groove 136 formed on the plane P to extend in the longitudinal direction of the pin half 4L and an elongated protrusion 137 formed on the plane P to extend in the longitudinal direction of the pin half 4L in a position symmetrical to the position of the groove 136 about the center line. A through hole 138 is formed in the upper flange 13 to extend from the plane P to the outer surface of the flange 13 while an engagement projection 139 is formed on the lower flange 13 to project from the plane P. The through hole 138 is provided with a pair of engagement shoulders 138a and the engagement projection 139 comprises a pair of resilient engagement pieces 139a each having a hook portion 139a projecting outward.

Figure 32:
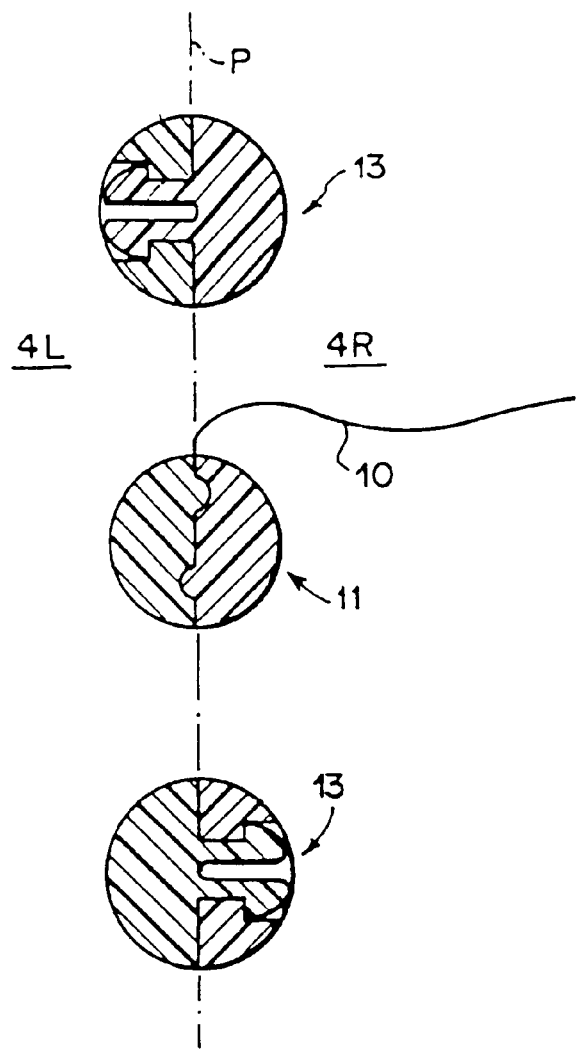
FIG. 32 shows cross-sections of the thirteenth example taken along different planes.

The right pin half 4R is identical to the left pin half 4L except that the right pin half 4R is positioned upside down relative to the left pin half 4L. That is, when the left and right pin halves 4L and 4R are butted together with the leading end portion of the magnetic tape 10 intervening therebetween, the engagement projection 138a on each of the left and right pin halves 4L and 4R is inserted into the through hole 138 of the other pin half, and the protrusion 137 of each of the left and right pin halves 4L and 4R is inserted into the grooves 136 of the other pin half as shown in FIG. 32. The hook portions 139b of the engagement projections 139a are engaged with the engagement shoulders 138a of the through holes 138 and hold together the left and right pin halves 4L and 4R with the magnetic tape 10 pinched therebetween. It is preferred that the radius of curvature of the end faces of the engagement pieces 139a be equal to that of the outer surfaces of the flanges 13 so that the outer surfaces of the flanges 13 formed by the pin halves 4L and 4R become smooth.

Further the magnetic tape 10 is firmly clamped between the left and right pin halves 4L and 4R by virtue of the engagement between the grooves 136 and the protrusions 137.

This example is advantageous from the viewpoint of productivity in that the leader pin can be formed by two identical members and assembly of the leader pin and clamp of the magnetic tape 10 can be effected at one time by simply pressing the left and right halves 4L and 4R against each other.

Figure 33:
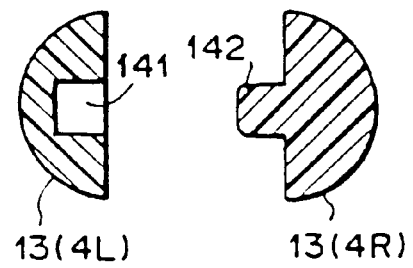
FIG. 33 is a cross-sectional view for illustrating a modification of the thirteenth example.

Instead of fixing the pin halves 4L and 4R to each other by engagement of the flanges 13 as in the thirteenth example, the pin halves 4L and 4R may be fixed to each other by fitting a projection 142 on one of the flanges in a recess 141 on the other flange as shown in FIG. 33 and bonding the pin halves 4L and 4R by adhesive. This arrangement is advantageous in that no hole is formed on the outer surfaces of the flanges.

In the fourteenth example shown in FIGS. 34, 35A, 35B and 36A to 36C, the leader pin 4 is formed by first and second members 4M and 4S. The first member 4M is provided with a main portion 11 in the form of a hollow cylindrical member having an axial hole 143 and a slit 144 communicated with the axial hole 143. One of the small diameter portions 12 and one of the flanges 13 are formed on the upper end of the main portion 11 and the axial hole 143 opens in the lower end face of the main portion 11 which is flat. The second member 4S has a shaft portion 145 which is inserted for rotation into the axial hole 143 of the first member 4M and the other small diameter portion 12 and the other flange 13 are formed on the lower end face of the shaft portion 145. The shaft portion 145 is semi-circular in cross-section and has a flat side surface 145a.

Figures 36A, 36B, 36C:
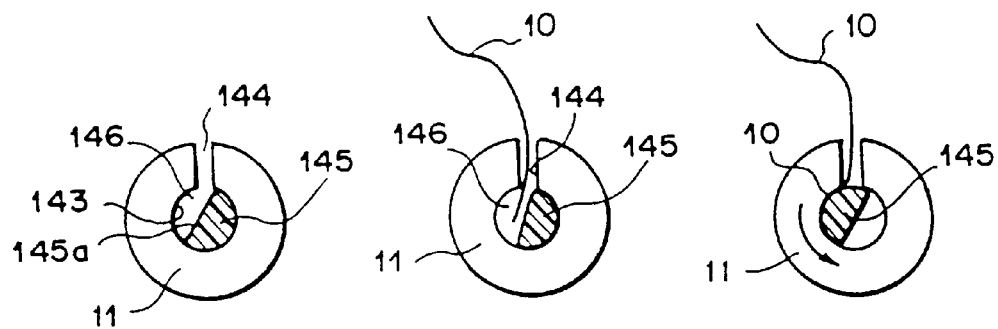

When the leader pin 4 is assembled, the shaft portion 145 of the second member 4S is inserted into the axial hole 143 of the first member 4M with the flat surface 145a faced so that a space 146 communicated with the slit 144 is formed inside the axial hole 143 as shown in FIG. 36A. Then the leading end portion of the magnetic tape 10 is inserted into the space 146 through the slit 144 as shown in FIG. 36B, and then the shaft portion 145 is rotated counterclockwise so that the magnetic tape 10 is pinched between the inner surface of the axial hole 143 and the arcuate outer surface of the shaft portion 145 as shown in FIG. 36C. This example is advantageous in that the leader pin is easy to assemble.

The leading end portion of the magnetic tape 10 may be inserted into the axial hole 143 before the shaft portion 145 is inserted into the axial hole 143.

Figure 37:
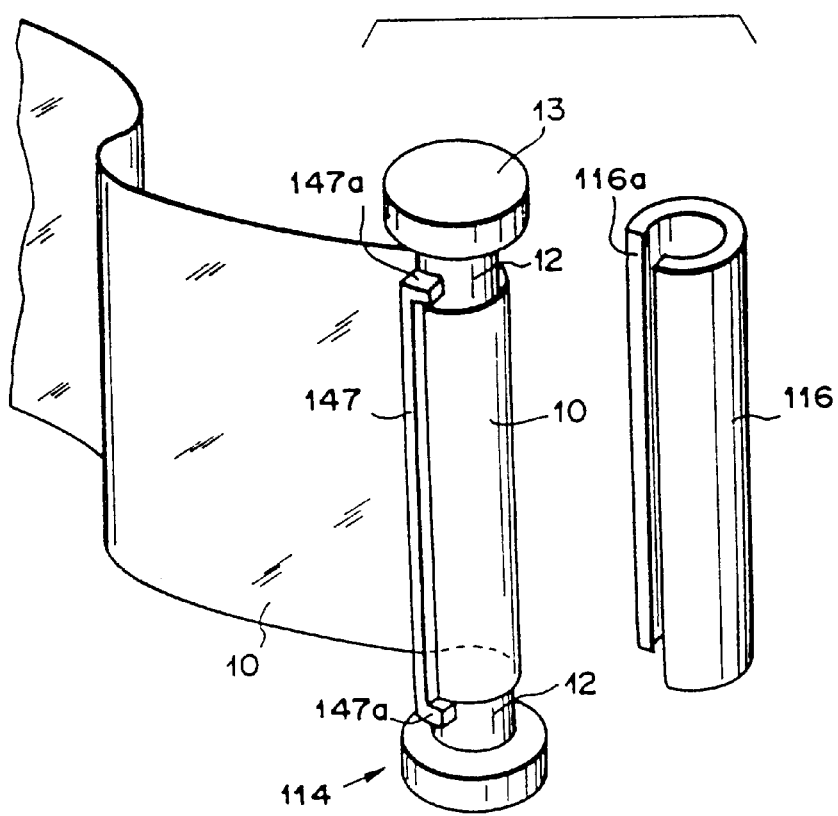
FIG. 37 is an exploded perspective view of a fifteenth specific example of the leader pin.
Figure 38:
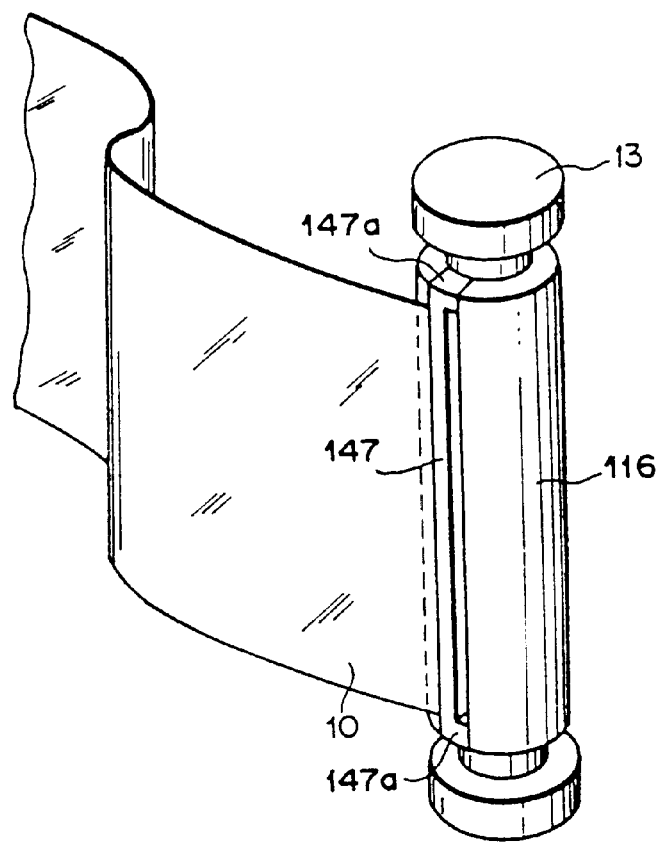
FIG. 38 is a perspective view of the fifteenth example in an assembled state.
Figure 39:
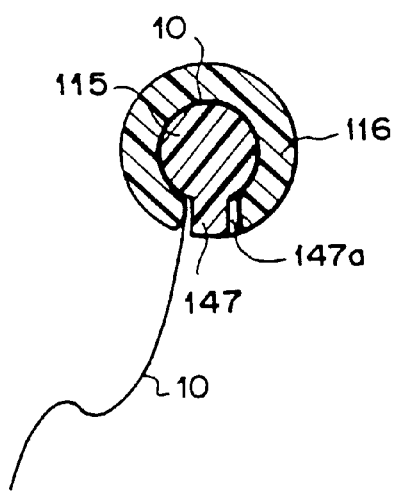
FIG. 39 is a cross-sectional view of the fifteenth example.

In the fifteenth example shown in FIGS. 37 to 39, the leader pin 4 comprises a pin body 114 and a clamp member 116 which is fitted on the pin body 114 to form the main portion 11. The pin body 114 has a shaft portion 115 which is substantially equal in outer diameter to the small diameter portions 12. A protrusion 147 is formed on the outer surface of the shaft portion 115 to extend in the longitudinal direction of the pin body 114 and a pair of short protrusions 147a for positioning the magnetic tape 10 are formed at the ends of the protrusion 147 to extend in a circumferential direction of the shaft portion 115.

As shown in FIG. 39, the protrusion 147 is shaped so that the main portion 11 formed when the clamp member 116 is fitted on the shaft portion 115 is substantially circular in cross-section.

The protrusion 147 facilitates positioning of the leading end of the magnetic tape 10 in the longitudinal direction of the tape 10 and the short protrusions 147a facilitate positioning of the magnetic tape 10 in the transverse direction thereof.

Figure 40:
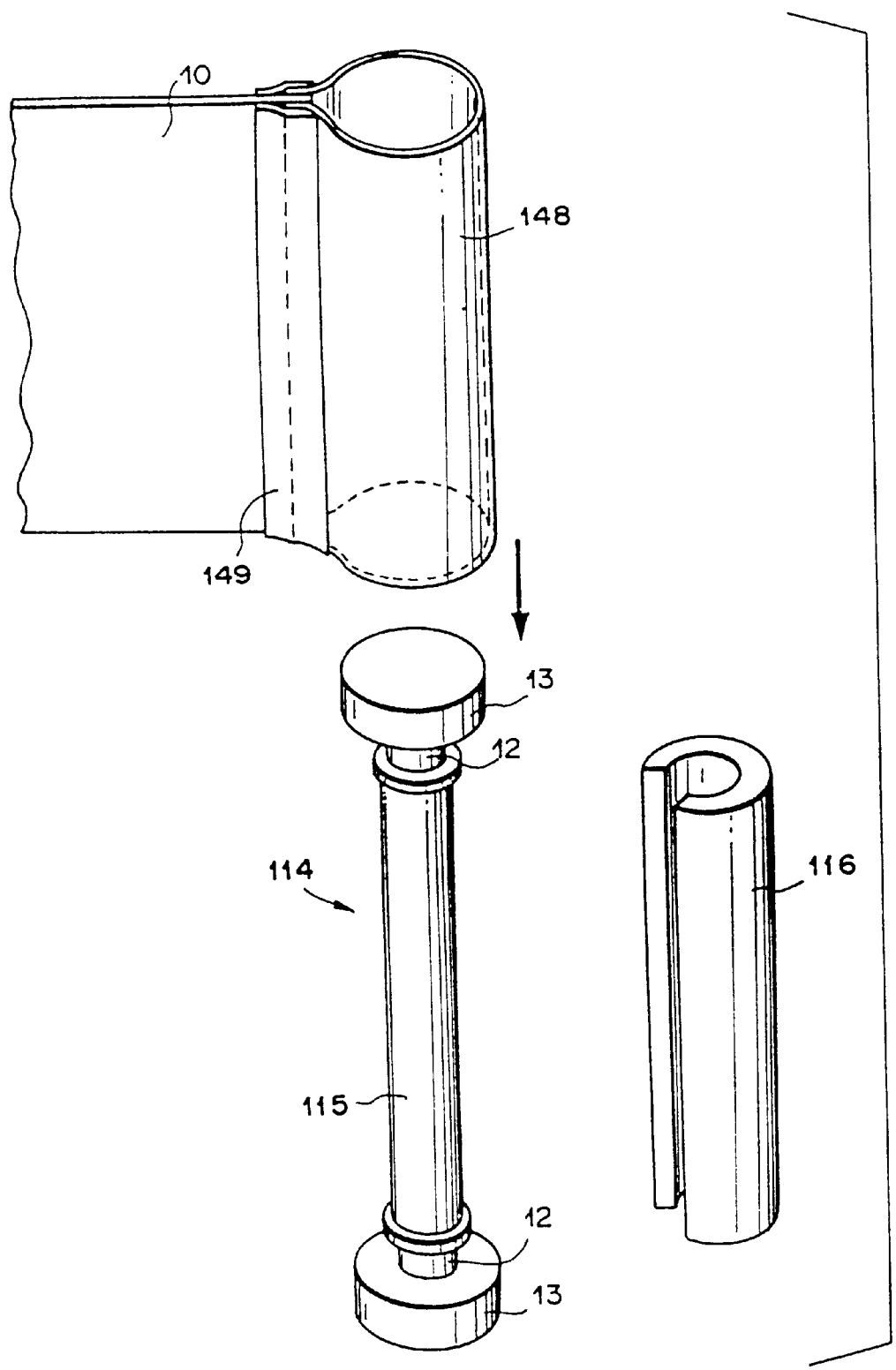
FIG. 40 is an exploded perspective view of a sixteenth specific example of the leader pin.

In the sixteenth example shown in FIGS. 40, 41A and 41B, a loop of a leader tape 148 is connected to the leading end of the magnetic tape 10 and the pin body 114 is inserted into the loop of the leader tape 148 so that the shaft portion 115 is opposed to the leader tape 148. Then the magnetic tape 10 is pulled leftward as seen in FIG. 40 so that the leader tape 148 is brought into close contact with the shaft portion 115 and then the clamp member 116 is press-fitted on the shaft portion 115 with the leader tape 148 intervening therebetween.

The loop of the leader tape 148 may be made around the pin body 114 after placing the pin body 114 on the first leader tape. Further the magnetic tape 10 may be connected to the leader pin by way of a loop of a splicing tape in place of the loop of the leader tape.

The leader tape 148 may be bonded to the magnetic tape 10 by use of splicing tape 149 as shown in FIG. 41A. Otherwise, heat-sensitive adhesive may be applied to the inner surface of the leader tape 148 and the opposite ends of the leader tape 148 may be bonded to opposite sides of the leading end portion of the magnetic tape 10 as shown in FIG. 41B by applying heat to the opposite ends of the leader tape 148 with the leading end portion of the magnetic tape 10 sandwiched therebetween. In this case, the leader tape 148 may be bonded to the shaft portion 115 by the heat-sensitive adhesive, if desired.

It is possible to use a heat-shrinkable leader tape 148 and fix the leader tape 148 to the shaft portion 115 by heating and shrinking the loop of the leader tape 148 after the shaft portion 115 is inserted into the loop. In this case, the clamp member 116 may be eliminated.

In this example, even when the leader tape 148 is connected to the magnetic tape 10 by use of a splicing tape 149, the length d of the spliced portion can be short as shown in FIG. 41A, whereby adverse effect of the shoulders formed at the spliced portion can be avoided when the leader pin is drawn into the tape drive system.

In the case where the clamp member 116 is formed of synthetic resin, there is fear that tape holding strength of the clamp member 116 is weakened due to expansion and/or reduction in coefficient of elasticity of the resin when the leader pin is stored or used under an elevated temperature. When the clamp member 116 is formed of crystalline resin such as polyamide, polyoxymethylene or polybutylene terephthalate and the temperature of the mold is set lower than the normal temperature when molding the clamp member 116 so that the resin becomes low in crystallinity, reduction in the tape holding strength of the clamp member 116 can be avoided since the crystallinity of the resin is increased to shrink the clamp member 16 and the coefficient of elasticity of the clamp member 116 increased as the temperature increases.

Further when the outer surface of the shaft portion 115 and/or the inner surface of the clamp member 116 is roughened by graining, etching, spark erosion or the like, disengagement of the magnetic tape 10 from the leader pin can be prevented.

When the surface roughness Rz of the surfaces is too small, the tape holding force becomes poor and when the surface roughness of the surfaces is too large, ejection of the clamp member 116 from the mold becomes difficult, scrapings of resin are produced when the clamp member 116 is press-fitted on the pin body 114 and/or the magnetic tape 10 can be broken. Accordingly the surface roughness Rz is preferably in the range of 0.7 $\mu m \leq Rz \leq 30$ $\mu m$ and more preferably in the range of 1 $\mu m \leq Rz \leq 20$ $\mu m$.

Further when the clamp member 116 is press-fitted on the shaft portion 115 of the pin body 114 with the magnetic tape 10 intervening therebetween, air can be trapped between the magnetic tape 10 and the clamp member 116 and the magnetic tape 10 is wrinkled. This problem can be overcome by forming a slit or a hole in the clamp member 116 at the center thereof.

In the examples where the clamp member 116 is press-fitted sideways on the shaft portion 115 with the magnetic tape 10 intervening therebetween out of the examples described above, there is fear that the magnetic tape 10 is broken especially when the magnetic tape 10 is thin. This problem can be overcome by folding the leading end portion of the magnetic tape 10 in two or more as shown in FIGS. 42A to 42C and press-fitting clamp member 116 on the shaft portion 115 with the folded portion 150 of the magnetic tape 10 intervening therebetween. The folded portion 50 also functions as a damper when the magnetic tape 10 is pulled.

Figure 43:
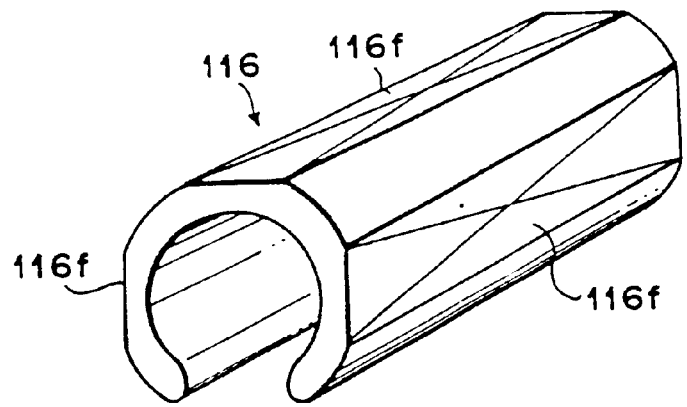
FIG. 43 is a perspective view of a modification of the clamp member.
Figure 44:
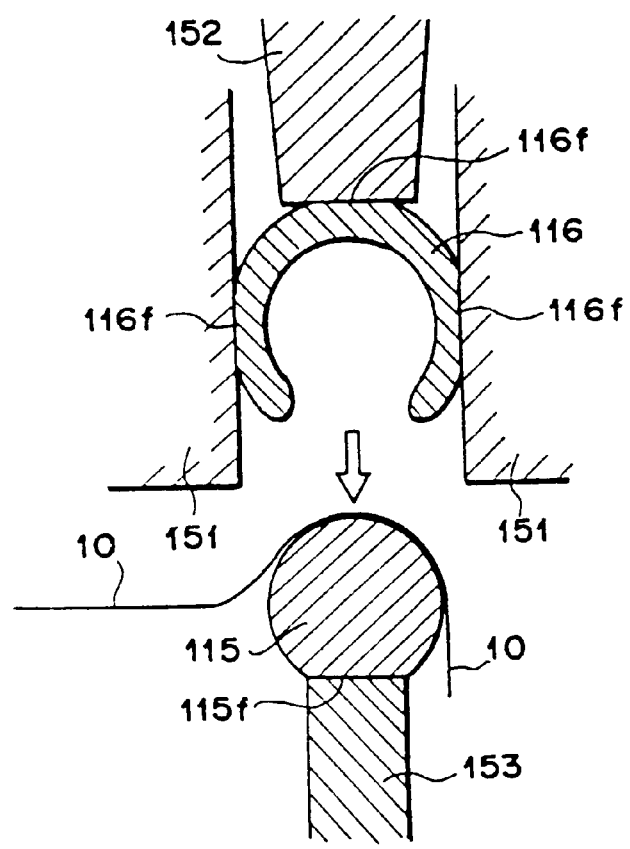
FIG. 44 is view for illustrating an example of the manner for press-fitting the clamp member shown in FIG. 43 on the pin body.

Further it is preferred that the clamp member 116 be provided with a flat portion 116f on at least one part of the outer surface thereof as shown in FIG. 43. For example, when the clamp member 116 is press-fitted on the pin body 114, the clamp member 116 is held by holding jigs 151 with its slit faced downward above the pin body 114 and the magnetic tape 10 supported on a support 153 and is pressed against the shaft portion 115 by a pusher tool 152.

Accordingly when the flat portions 116f are in parallel to the direction of pushing the clamp member 116 by the pusher tool 152, positioning of the clamp member 116 with respect to the holding jigs 151. A flat portion 116f on the side of the clamp member 116 opposite to the slit limits the direction of pushing the clamp member 116 by the pusher tool 152 and ensures the area at which the pusher tool 152 pushes the clamp member 116. Further when a flat portion 115f is provided on the pin body 114 at the portion facing the support 153, the pin body 114 can stably supported on the support 153.

Figure 45:
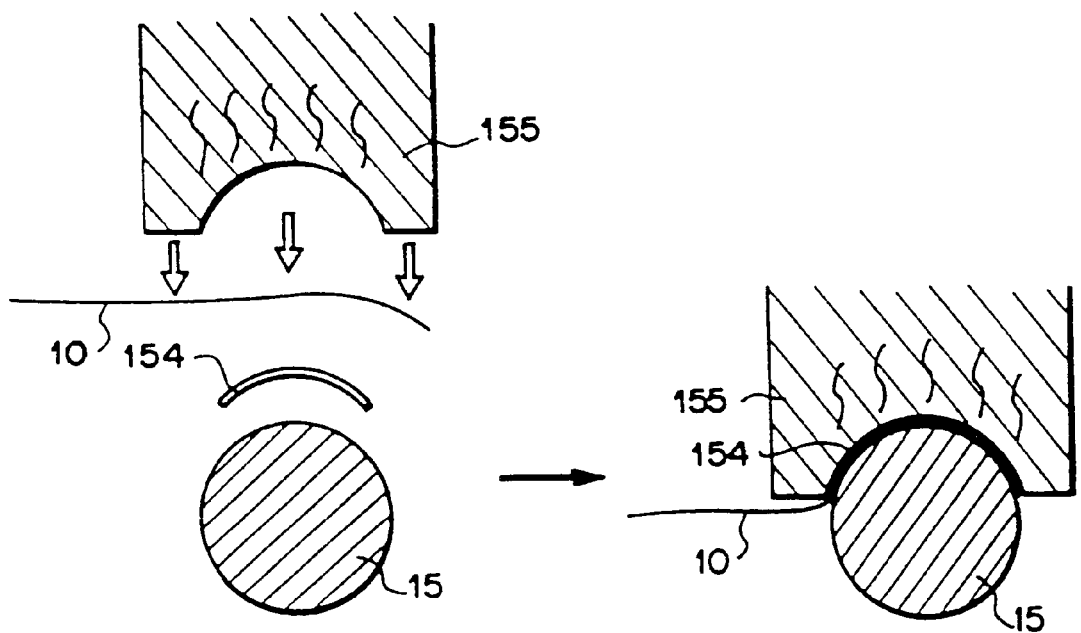
FIG. 45 is a view for illustrating a method of bonding the magnetic tape to the leader pin by use of hot-melt adhesive tape.

The magnetic tape 10 may be directly bonded to the leader pin by use of hot-melt adhesive tape 154 and a hot pressing tool 155 as shown in FIG. 45. Use of the hot-melt adhesive tape is advantageous in that the adhesive layer can be more uniform in thickness than when adhesive is used and it is not necessary to use solvent.

It is preferred that the outer peripheral surface of each flange 13 be provided with non-skid treatment such as knurling, diamond knurling and splining. This is for preventing slip of the leader pin when the leader pin is chucked by an assembly jig during assemble of the magnetic tape cartridge or by the tape drawing mechanism of the tape drive system.

Figure 46:
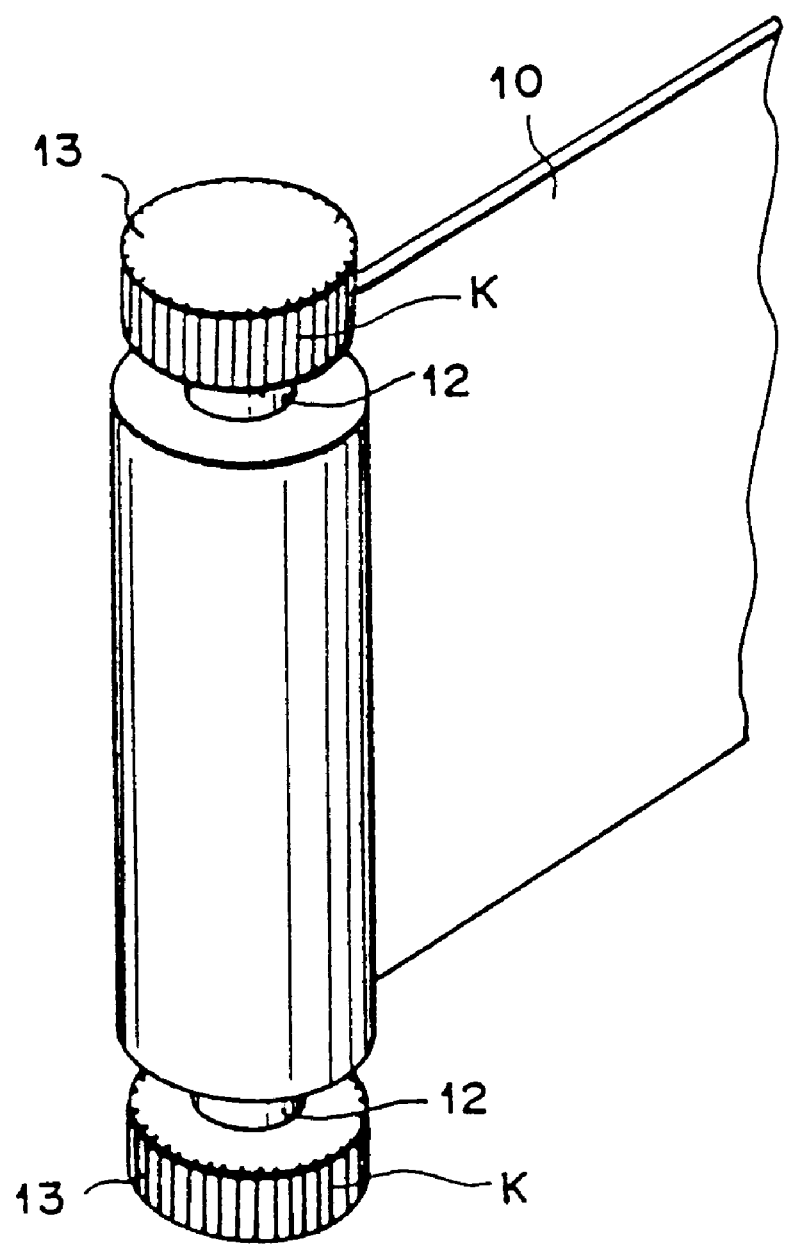
FIG. 46 is a perspective view of a leader pin of another example.

In the example shown in FIG. 46, the outer peripheral surfaces of the flanges 13 are splined as indicated at K.

It is further preferred that the leader pin be provided with a cutaway portion for determining the angular position of the leader pin in order to facilitate positioning the leader pin when connecting the magnetic tape to the leader pin and when the leader pin is incorporated in the cartridge casing.

Figure 47A:
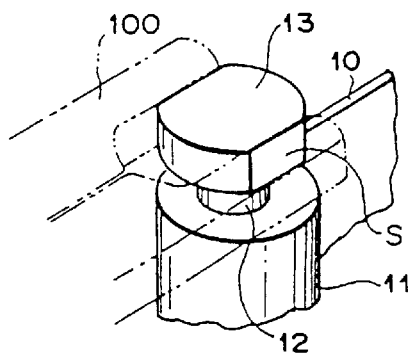
FIG. 47A is a fragmentary perspective view of a leader pin of still another example.
Figure 47B:
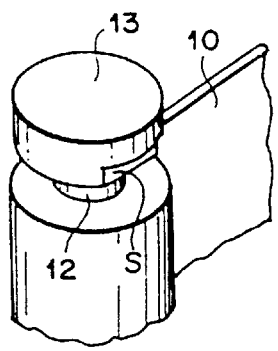
FIGS. 47B and 47C are fragmentary perspective views showing modifications of the leader pin.
Figure 47C:
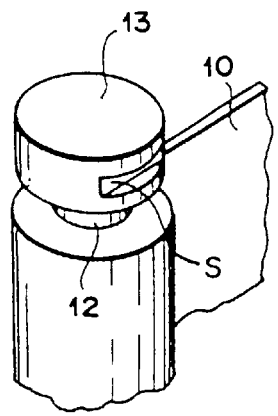

In the example shown in FIG. 47A, the upper flange 13 is provided with a pair of parallel flat surfaces S. The flat surfaces S are parallel to each other and to the direction in which the magnetic tape 20 extends from the leader pin. As shown by the chained line in FIG. 47A, an assembly jig 100 chucks the leader pin at the flat surfaces 5, whereby the assembly jig 100 can chuck the leader pin constantly in a predetermined angular position. As shown in FIGS. 47B and 47C, the flat surfaces S may be formed only a part of the flange 13 as seen in the direction of thickness of the flange 13.

It is generally required that the main portion 11 of the leader pin has a predetermined outer diameter when the leader pin is incorporated in the cartridge casing. In some of the preceding examples, this requirement can be met by properly selecting the outer diameter of the clamp member 116. However this requirement may also be met without use of the clamp member.

Figure 48:
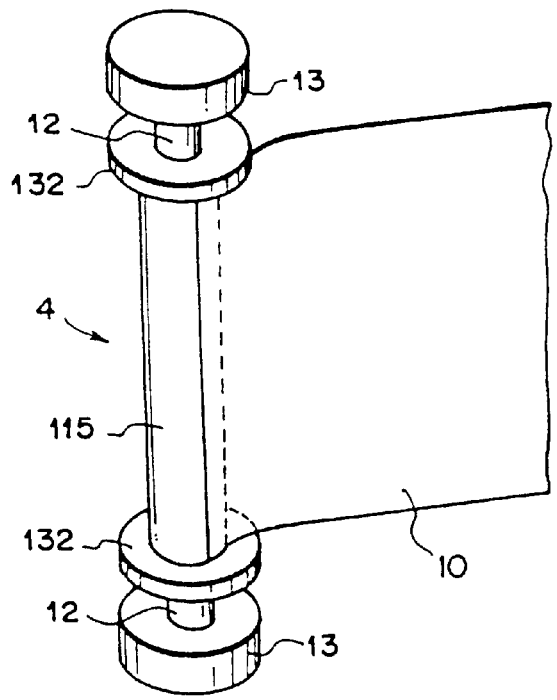
FIGS. 48 and 49 are perspective views showing the manner of forming a leader pin-magnetic tape assembly.
Figure 49:
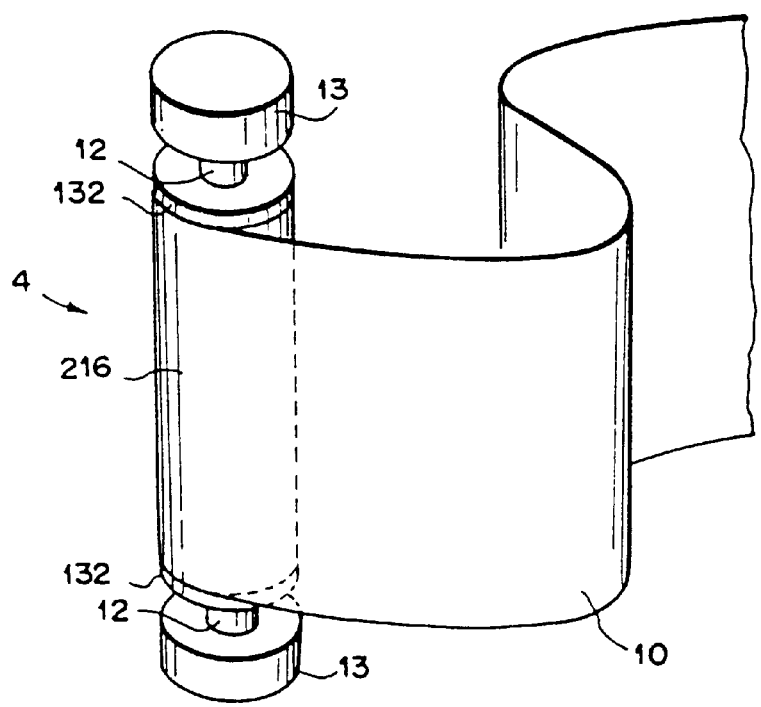
Figure 50:
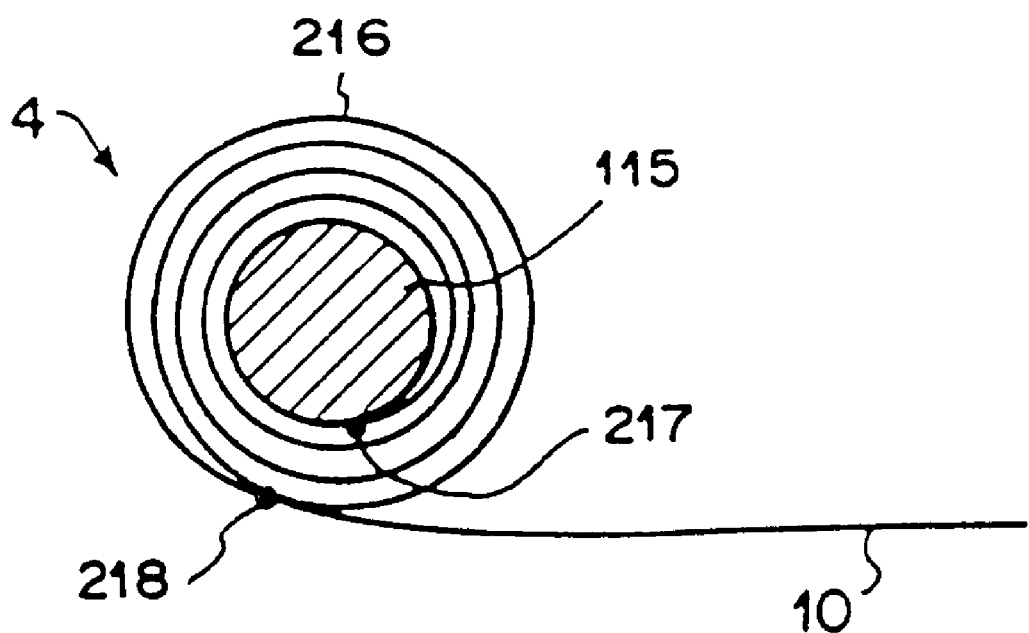
FIG. 50 is a transverse cross-sectional view of FIG. 49, view showing

That is, in the example shown in FIGS. 48 to 50, the leader pin 4 comprises a shaft portion 115, a pair of inner flanges 132 on opposite ends of the shaft portion 115, a pair of small diameter portions 12 on the outer sides of the inner flanges 132 and a pair of outer flanges 13 on the outer sides of the small diameter portions 12. The inner flanges 132 are substantially equal in outer diameter to the outer flanges 13. The leading end of the magnetic tape 10 is tacked to the outer surface of the shaft portion 115 by adhesive, water or alcohol and the magnetic tape 10 is wound around the shaft portion 115 until the outer diameter of the tape roll 216 becomes substantially equal to that of the inner flanges 132 while applying light tension to the magnetic tape 10. Then the magnetic tape 10 is bonded to the outermost run of the tape roll 216 by adhesive as shown in FIGS. 48 to 50. In FIG. 50, reference numeral 217 denotes adhesive, water or alcohol for tacking the leading end of the magnetic tape 10 to the shaft portion 115 and reference numeral 218 denotes the adhesive for bonding the magnetic tape 10 to the outermost run of the tape roll 216. In this state, the leader pin 4 is incorporated in the cartridge casing.

In any one of the preceding examples, it is preferred that the leader pin be formed of corrosion resistant material. As the corrosion-resistant material, plastic materials such as aliphatic polyamides (e.g., nylon 6, nylon 66(6,6; 6/6) and the like), aromatic polyamide, polycarbonate, polybutylene terephthalate, polyphenylene sulfide, polymethyl methacrylate, polyoxymethylene, and the like, plastic materials having an imide group such as polyimide, polyamide-imide, polyether-imide and the like, stainless steel materials such as SUS304, SUS306, SUS316, SUS410 and the like may be employed. These materials are also advantageous in that they are hard to magnetize. That is, when the leader pin is magnetized, magnetism of the leader pin can affect the information recorded on the magnetic tape. When the leader pin is to be formed of the aforesaid plastic materials, it is preferred that the plastic materials be reinforced with glass fibers or carbon fibers.

Further the leader pin may be provided with hard chrome plating.

Figure 51:
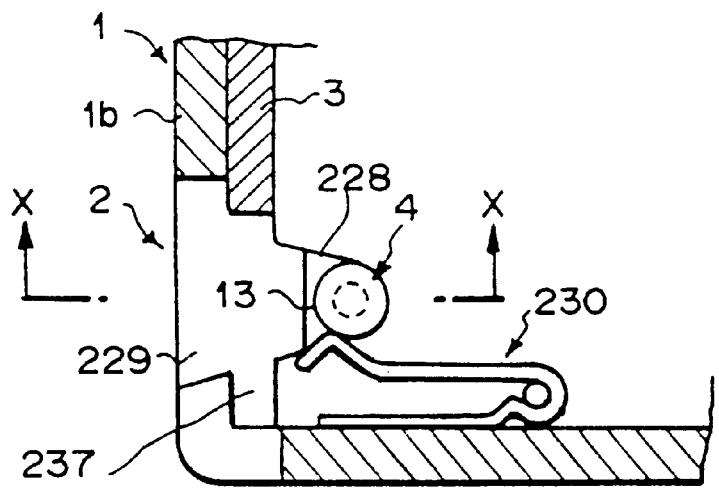
FIG. 51 is a fragmentary cross-sectional view showing the inside of the magnetic tape cartridge near the tape outlet opening 2.

As shown in FIG. 51, the leader pin 4 on the leading end of the magnetic tape 10 is held in a recess 228 formed inside the tape outlet opening 2 by a pair of spring members 230 which press the flanges 13 of the leader pin 4 against the inner surface of the recess 228 when the magnetic tape cartridge is not used.

Figure 52:
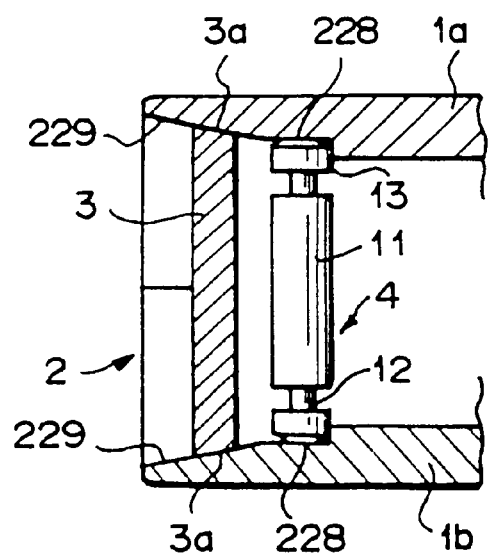
FIG. 52 is a cross-sectional view taken along line X—X in FIG. 41.

As shown in FIG. 52, guide surfaces 229 for guiding the leader pin 4 into the recess 228 are formed on the inner surfaces of the upper and lower casing halves 1a and 1b. It is preferred that the peripheral edges of the upper and lower flanges 13 be chamfered so that they can smoothly slide on the guide surfaces 229. The recess 228 has upper and lower inner surfaces which are flat and spaced from each other by a distance substantially equal to the length of the leader pin 4. The guide surfaces 229 are inclined so that they linearly approach each other toward the recess 228. The slide door 3 is slid back and forth across the guide surfaces 229 and the upper and lower faces 3a of the slide door 3 are inclined to conform to the shape of the guide surfaces 229.

When the magnetic tape 10 is rewound and the leader pin 4 is retracted into the recess 228, the flanges 13 slide on the upper and lower guide surfaces 229 and the leader pin 4 is successfully retracted into the recess 228 even if the center of the leader pin 4 is shifted from the center of the recess 228.

Though, in this embodiment, the space between the upper and lower guide surfaces 229 linearly changes, it may change curvilinearly. That is, each guide surface 229 may be curved. In such a case, the upper and lower end faces 3a of the slide door 3 are shaped to conform to the shape of the guide surfaces 229.

FIG. 53 shows a modification of the guide surface 229.

In this modification, the guide surface 229 is provided with a V-shaped groove 233 which extends from the tape outlet opening 2 to the flat recess 288. The groove 233 is formed over the entire width of the guide surface 299 and becomes shallower toward the recess 228.

With this arrangement, the flange 13 of the leader pin 4 slides along the center of the guide surface 229 at which the groove 233 is deepest and is smoothly guided to the recess 228 in an erected position.

In another modification shown in FIG. 54, the guide surface 229 is provided with a V-shaped groove 234 which extends from the tape outlet opening 2 to the flat recess 288 and becomes smaller in width toward the recess 228.

With this arrangement, the flange 13 of the leader pin 4 slides along the center of the guide surface 229 at which the groove 234 is deepest and as the flange 13 approaches the recess 228, the flange 13 comes to run onto the flat surfaces on opposite sides of the groove 234, whereby the leader pin 4 can be smoothly guided into the recess 228.

As shown in FIGS. 55A and 55B, the guide surface 229 may be provided with V-shaped groove 235 or U-shaped groove 236 only at the middle portion thereof.

In FIGS. 53, 54, 55A and 55B, reference numeral 237 denotes a sliding groove along which the slide door 3 is slit.

The grooves 233 and 234 in the modifications shown in FIGS. 53 and 54 may be U-shaped in cross-section.

The guide surface and/or the surface of the sliding groove 237 may be subjected to treatment for reducing friction so that the leader pin 4 or the slide door 3 slides more smoothly.

The treatment may involve, for instance, embossing, application of lubricant such as silicone, or application of a low friction sheet.

What is claimed is:

1. A magnetic tape cartridge comprising a cartridge casing, a single reel around which a magnetic tape is wound and which is contained in the cartridge casing for rotation and a leader pin fixed to the leading end portion of the magnetic tape, wherein the improvement comprises
that the leader pin comprises a pin body which is provided at its opposite ends with engagement portions which are brought into engagement with a tape drawing mechanism of a recording and reproducing system when the magnetic tape cartridge is loaded in the recording and reproducing system, and a pair of members which are bonded together with the pin body and the leading end portion of the magnetic tape intervening therebetween.

* * * * *